United States Patent
Hoversten et al.

(10) Patent No.: US 12,069,580 B2
(45) Date of Patent: *Aug. 20, 2024

(54) POWER MANAGEMENT CONTROL OVER A TRANSMISSION LINE FOR MILLIMETER WAVE CHIP SETS FOR CELLULAR RADIOS

(71) Applicant: Eta Wireless, Inc., Cambridge, MA (US)

(72) Inventors: John R. Hoversten, Arlington, MA (US); Yevgeniy A. Tkachenko, Belmont, MA (US); Birol Bekirov, Cambridge, MA (US); Sri Harsh Pakala, Chandler, AZ (US); James Garrett, Windham, NH (US)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,685

(22) Filed: Aug. 20, 2021

(65) Prior Publication Data

US 2021/0385752 A1    Dec. 9, 2021

Related U.S. Application Data

(63) Continuation of application No. 17/281,080, filed as application No. PCT/US2020/049548 on Sep. 4, 2020, now Pat. No. 11,191,028.

(60) Provisional application No. 62/896,634, filed on Sep. 6, 2019, provisional application No. 62/896,638, filed on Sep. 6, 2019.

(51) Int. Cl.
*H04W 52/02* (2009.01)
*H04L 27/34* (2006.01)

(52) U.S. Cl.
CPC ......... *H04W 52/0261* (2013.01); *H04L 27/34* (2013.01)

(58) Field of Classification Search
CPC .......... H04W 52/0261; H04W 52/0274; H04L 27/34; Y02D 30/70
See application file for complete search history.

(56) References Cited

U.S. PATENT DOCUMENTS

| | | |
|---|---|---|
| 8,121,541 B2 | 2/2012 | Rofougaran |
| 8,824,978 B2 | 9/2014 | Briffa et al. |
| 8,829,993 B2 | 9/2014 | Briffa et al. |
| 8,830,709 B2 | 9/2014 | Perreault et al. |
| 8,830,710 B2 | 9/2014 | Perreault et al. |

(Continued)

FOREIGN PATENT DOCUMENTS

CN    110050433    7/2019

OTHER PUBLICATIONS

Notice of Allowance dated Aug. 31, 2021 for U.S. Appl. No. 17/281,080; 19 Pages.

(Continued)

*Primary Examiner* — Dinh Nguyen
(74) *Attorney, Agent, or Firm* — Daly, Crowley, Mofford & Durkee, LLP

(57) ABSTRACT

Described are circuits and techniques to communicate a digital envelope signal from a baseband chipset to a discrete supply modulator power management circuit (PMC). Also described is an apparatus and technique for power management control over a radio frequency (RF) transmission line for millimeter wave chip sets for cellular radios.

17 Claims, 13 Drawing Sheets

(56) References Cited

U.S. PATENT DOCUMENTS

| | | |
|---|---|---|
| 8,957,727 B2 | 2/2015 | Dawson et al. |
| 9,020,453 B2 | 4/2015 | Briffa et al. |
| 9,160,287 B2 | 10/2015 | Briffa et al. |
| 9,166,536 B2 | 10/2015 | Briffa et al. |
| 9,172,336 B2 | 10/2015 | Briffa et al. |
| 9,209,758 B2 | 12/2015 | Briffa et al. |
| 9,490,752 B2 | 11/2016 | Briffa et al. |
| 9,531,291 B2 | 12/2016 | Perreault |
| 9,537,456 B2 | 1/2017 | Briffa et al. |
| 9,755,672 B2 | 9/2017 | Perreault et al. |
| 9,768,731 B2 | 9/2017 | Perreault et al. |
| 9,979,421 B2 | 5/2018 | Astrom et al. |
| 10,164,577 B2 | 12/2018 | Briffa et al. |
| 10,658,981 B2 | 5/2020 | Briffa et al. |
| 10,992,265 B2 | 4/2021 | Hoversten et al. |
| 11,191,028 B2 | 11/2021 | Hoversten et al. |
| 11,245,367 B2 | 2/2022 | Garrett et al. |
| 11,637,531 B1 | 4/2023 | Perreault et al. |
| 2003/0235236 A1* | 12/2003 | Santhoff .............. H04B 3/542 375/130 |
| 2005/0124307 A1* | 6/2005 | Ammar ................ H04B 1/38 455/259 |
| 2009/0030067 A1 | 1/2009 | Wosikowski-Buters et al. |
| 2009/0143101 A1 | 6/2009 | Rofougaran |
| 2010/0216412 A1 | 8/2010 | Rofougaran |
| 2011/0276812 A1 | 11/2011 | Lee et al. |
| 2012/0076040 A1* | 3/2012 | Hoshino .............. H04L 1/0027 370/252 |
| 2013/0173938 A1 | 7/2013 | Yang |
| 2014/0045422 A1 | 2/2014 | Qi et al. |
| 2017/0257837 A1 | 9/2017 | Lee et al. |
| 2019/0289668 A1 | 9/2019 | He et al. |
| 2021/0288614 A1 | 9/2021 | Hoversten et al. |
| 2021/0385752 A1 | 12/2021 | Hoversten et al. |
| 2022/0131463 A1 | 4/2022 | Giuliano et al. |
| 2022/0149725 A1 | 5/2022 | Garrett et al. |
| 2023/0054485 A1 | 2/2023 | Hoversten et al. |
| 2023/0056740 A1 | 2/2023 | Perreault et al. |
| 2023/0057037 A1 | 2/2023 | Hoversten et al. |

OTHER PUBLICATIONS

U.S. Appl. No. 17/281,080, filed Mar. 29, 2021, Hoversten, et al.
International Search Report and Written Opinion dated Dec. 10, 2020 for International application No. PCT/US2020/049548; 13 Pages.
Office Action dated Aug. 18, 2021 for U.S. Appl. No. 17/281,080; 22 Pages.
Response to Office Action dated Aug. 18, 2021 and filed on Aug. 19, 2021 for U.S. Appl. No. 17/281,080; 11 Pages.
International Preliminary Report on Patentability dated Mar. 17, 2022 for International Application No. PCT/US2020/049548; 12 Pages.
Chinese Office Action (with English Translation) dated Jul. 22, 2023 for Chinese Application No. 202080062362.7; 23 Pages.
Response (with English Amended Claims and FA Reporting Letter) to Chinese Office Action dated Jul. 22, 2023 for Chinese Application No. 202080062362.7; Response filed on Dec. 6, 2023; 26 Pages.
Chinese Office Action (with English Translation) dated Mar. 13, 2024 for Chinese Patent Application No. 202080062362.7; 7 pages.

* cited by examiner

POWER MANAGEMENT CONTROL OVER A TRANSMISSION LINE FOR MILLIMETER WAVE CHIP SETS FOR CELLULAR RADIOS

CROSS REFERENCE TO RELATED APPLICATIONS

This application is a continuation of U.S. application Ser. No. 17/281,080 filed on Mar. 29, 2021, which is a U.S. National Stage Application of PCT Application PCT/US2020/049548 filed in the English language on Sep. 4, 2020, which claims the benefit of U.S. Provisional Application 62/896,634 filed on Sep. 6, 2019, and U.S. Provisional Application 62/896,638 also filed on Sep. 6, 2019. The entire contents of these applications are incorporated by reference herein.

BACKGROUND

As is known in the art, the efficiency of radio-frequency (rf) power amplifiers (PAs) can be improved through a technique referred to as "supply modulation" (also sometimes referred to as "drain modulation" or "collector modulation"). In such a technique, a power supply voltage provided to the PA is adjusted dynamically ("modulated") over time depending upon the RF signal being synthesized. For the largest efficiency improvements, supply voltage can be adjusted discretely (among discrete levels) or continuously on a short time scale that tracks or dynamically accommodates rapid variations in rf signal amplitude (or envelope), such as may occur as data is encoded in the rf signal or as the rf signal amplitude is desired to be changed with high envelope bandwidth (e.g., as in envelope tracking, envelope tracking advanced, polar modulation, "class G" power amplification, multilevel back-off, multilevel LINC, Asymmetric Multilevel Out-phasing, etc.). The power supply voltage (or voltage levels) provided to the PA may also be adapted to accommodate longer-term changes in desired rf envelope (e.g., "adaptive bias") such as associated with adapting transmitter output strength to minimize errors in data transfer, for rf "traffic" variations, etc.

"Continuous" supply modulation (e.g., "envelope tracking" or "adaptive bias") may be advantageously realized by dynamically selecting an intermediate voltage from among a set of discrete power supply voltages and then further regulating (stepping down) this intermediate voltage to create a continuously-variable supply voltage to be provided to the power amplifier. Some rf amplifier systems utilize "Discrete" supply modulation (or discrete "drain modulation") in which the supply voltage is switched among a set of discrete voltage levels, possibly including additional filtering or modulation to shape the voltage transitions among levels. Systems of this type are described, for example, in, and include "class G" amplifiers, multi-level LINC (MLINC) Power Amplifiers, Asymmetric Multilevel Out-phasing (AMO) Power Amplifiers, Multilevel Back-off amplifiers (including "Asymmetric Multilevel Back-off" amplifiers) and digitized polar transmitters among other types. Hybrid systems which utilize a combination of continuous and discrete supply modulation may also be realized.

SUMMARY

Described are concepts, systems, circuits and techniques for a power management control interface for cellular radios and in particular for sub6-to-millimeter (mm) wave cellular radios.

Also described are concepts, systems, circuits and techniques to communicate a digital envelope signal from a modem or transceiver of a baseband chipset to a discrete supply modulator power management circuit (PMC). The concepts, systems, circuits and techniques are particularly useful to communicate a high-bandwidth digital envelope signal from a baseband chipset to a discrete supply modulator PMC.

In embodiments, a digitally controlled level (DCL) interface is described. The interface may be implemented in a relatively simple manner on both chipset and PMC sides of a system. The DCL interface operates with digital signals, reduces (and ideally minimizes) electro-magnetic interference (EMI) with other baseband chipset components, may be implemented with as few as two electrical connections between baseband chipset and PMC, may be encoded for error rejection, may be encoded for functional control of the PMC, and may be encoded to prevent misuse of the PMC or baseband chipset.

In embodiments, the DCL signals are encoded to reject errors when the transition between states is not ambiguous and can only represent a unique FSM state. In this way transitions to unique states will correct a bit error in the DCL signal.

In embodiments, in response to an auxiliary signal on a first auxiliary line having a first value. the FSM has a first sequence of FSM states; and in response to an auxiliary signal on a second auxiliary line having a second, different value, the FSM, has a second, different sequence of FSM states.

In embodiments, PMC inputs comprise one or more digital buffer circuits. In embodiments, a PMC digital buffer is followed by an input Schmitt trigger. In embodiments, input Schmitt trigger has a threshold symmetry such that the output transitions from a first value to a second, different value at substantially the same analog voltage level as it transitions from the second value to the first value. In embodiments, an input Schmitt trigger has a threshold symmetry such that the output transitions from "0" to "1" for rising input signals at the same analog voltage level as it transitions from "1" to "0" for falling signals.

In embodiments, each DCL input to the PMC corresponds to a logical supply modulator configured to carry configuration for a physical supply modulator including one or more of a configuration for multi-pulse transitions, a configuration for general-purpose switches related to that output, a configuration for average power tracking.

In embodiments, a mapping from logical to physical supply modulators can be reconfigured programmatically, such that any input can control any output.

In embodiments, the number of DCL inputs is different than the number of PMC VCC outputs. In embodiments, the number of DCL inputs is smaller than the number of PMC VCC outputs. In embodiments, the number of DCL inputs is larger than the number of PMC VCC outputs. In embodiments, the number of DCL inputs equals the number of PMC VCC outputs.

In embodiments, the system comprise a plurality of transmission lines coupled between the baseband chipset and the RF head, at least some of the plurality of transmission lines configured to propagate control and auxiliary signals between the baseband chip set and the RF head.

In embodiments, the system comprise one or more transmission lines and each of the one or more transmission lines are configured to propagate DCL and auxiliary signals between a chip set and an RF head.

In embodiments, time division multiplexing may be utilized to encode information (e.g. DCL information, PMC control information, DCL and PMC control information and/or a combination of DCL information and PMC control information. This approach may reduce the number of simultaneous states.

In accordance with one aspect of the concepts described herein, a system comprises: means for conveying discrete supply level and control information from a chipset to an RF head via a signal path by encoding and modulating the discrete supply level and control information and then and multiplexing the encoded, modulated discrete supply level information with already-present signals on the signal path between the chipset and the RF head.

In embodiments, the control information comprises one or more signals to control a power management circuit (PMC).

In embodiments, the means for conveying discrete supply level and control information from the chipset to the RF head a baseband chipset comprises: an encoder configured to receive a plurality of individual digital control logic (DCL) signals and configured to generate one or more encoded DCL signals at an output thereof; a modulator having an input coupled to the output of the encoder, the modulator configured to receive one or more encoded DCL signals from the encoder and modulate the encoded DCL signals provided thereto; an upconverter having an input coupled to an output of the encoder, the upconverter configured to convert modulated encoded DCL signals to an intermediate frequency (IF) signal; and a multiplexer having a first input coupled to the output of the upconverter and configured to receive one or more modulated, encoded DCL IF signals, having a second input configured to receive one or more IQ signals and having a third input configured to receive one or more control signals, the multiplexer configured to multiplex the one or more modulated, encoded DCL IF signals, the one or more IQ signals and the one or more control signals.

In embodiments, the encoder is further configured to receive one or more encoded auxiliary signals for controlling a finite state machine (FSM).

In embodiments, the modulator is configured to modulate the encoder output signal using quadrature amplitude modulation (QAM) before upconversion to the IF signal and multiplexing with the pre-existing IQ and control signals. In embodiments, the modulator is configured to modulate the encoder output signal using direct encoding before upconversion to the IF signal and multiplexing with the IQ and control signals.

In embodiments, a power management circuit (PMC) is configured to accept the discrete supply level and control information. In embodiments, the PMC is part of an RF head.

In embodiments, a signal path coupled between the chipset and the RF head is a transmission line coupled between the chipset and the RF head. In embodiments, the transmission line configured to allow substantially simultaneous propagation of the multiplexed one or more modulated, encoded discrete supply level and control information signals at a first IF frequency, the one or more IQ signals at a second IF frequency and the one or more control signals at a third IF frequency.

In embodiments, the RF head is a millimeter wave head. In embodiments, the RF head comprises: a demultiplexer having an input coupled to the RF transmission line, the demultiplexer configured to receive the multiplexed one or more modulated, encoded discrete supply level and control information signals, the one or more IQ signals and the one or more control signals from the baseband chip set and having a first demultiplexer output, a second demultiplexer output configured to provide a first one of IQ and control signals and a third demultiplexer outputs configured to provide a second one of IQ and control signals; a downconverter having an input coupled to the first output of the demultiplexer and configured to receive one or more modulated, encoded DCL IF signals; a demodulator having an input coupled to an output of the downconverter, the demodulator configured to demodulate the modulated signals provided thereto and provide a demodulated signal at an output thereof; and a decoder having an input coupled to the output of the demodulator, the decoder configured to decode the signals provided thereto and provide decoded signals at an output thereof to provide individual DCL signals.

In embodiments, the control signals comprise packet-based control signals. In embodiments, the discrete supply level and control information signals comprise PMC control signals.

In accordance with a further aspect of the concepts described herein, a power management control interface system comprising: a chipset; a power management circuit (PMC); one or more control lines coupled between the chipset and the PMC, wherein the chipset is configured to generate control signals and provide the control signals to the PMC wherein the control signals carry configuration information as one or more digitally controlled level (DCL) signals; and means, coupled between the chipset and the PMC, for changing a sequence of FSM states.

In embodiments, the means for changing a sequence of FSM states comprises at least one of: one or more auxiliary lines coupled between the chipset and the PMC, the one or more auxiliary lines configured to carry auxiliary signals which determine mapping of a DCL state to a corresponding state in a finite state machine (FSM) such that the FSM has the ability to move from a current state to one or more non-adjacent states; and sideline communication means.

In embodiments, sideline communication means comprises a MIPI RFFE serial communication bus coupled to a register and wherein the order of FSM states can be reconfigured by a register write operation.

In embodiments, by changing the value of an auxiliary signal on at least one of the one or more auxiliary lines the one or more auxiliary lines are configured to change a sequence of states in an FSM.

In embodiments, in response to changing a value of an auxiliary signal on at least one of the one or more auxiliary lines, an FSM sequence is changed from a first sequence of FSM states to a second different sequence of FSM states.

In accordance with a further aspect of the concepts described herein, a chipset for a 5G mobile handset comprises means for conveying discrete supply level and control information from the chipset to a power management circuit (PMC).

In embodiments, the means for conveying comprises: means for encoding discrete supply level and control information; means for modulating discrete supply level and control information; and means for multiplexing the encoded, modulated discrete supply level and control information with already-present signals on a transmission line configured to carry signals between the chipset and the PMC.

In embodiments, the means for encoding comprises encoder; the means for modulating comprises a modulator; and the means for multiplexing comprises a multiplexer.

In embodiments, the encoder is configured to receive discrete supply level and control information and is configured to generate one or more encoded discrete supply level and control information signals at an output thereof.

In embodiments, the modulator has an input coupled to the output of the encoder and is configured to receive one or more encoded discrete supply level and control information signals from the encoder and modulate the encoded discrete supply level and control information signals provided thereto.

In embodiments, the multiplexer has a first input coupled to the output of the modulator and configured to receive one or more modulated, encoded discrete supply level and control information signals, and has a second input configured to receive one or more IQ signals and has a third input configured to receive one or more packet-based control signals, the multiplexer configured to multiplex the one or more modulated, encoded discrete supply level and control information signals, the one or more IQ signals and the one or more control signals at an output thereof.

In embodiments, the means for conveying discrete supply level and control information from the chipset to a power management circuit (PMC) further comprises an upconverter having an input coupled to an output of the encoder and an output coupled to a first input of the multiplexer, the upconverter configured to convert modulated encoded discrete supply level and control information signals to an intermediate frequency (IF) signal different form the IF signal frequencies of the one or more IQ signals and the one or more control signals.

In embodiments, the multiplexer is configured to receive: one or more modulated, encoded discrete supply level and control information signals at a first IF frequency at the first input thereof; one or more IQ signals at a second IF frequency at a second input thereof; and one or more control signals at a third IF frequency at a third input thereof.

In embodiments, the first IF frequency is different from the second IF frequency; and the second IF frequency is different from the third IF frequency.

In accordance with a still further aspect of the concepts described herein, a power management control interface system comprises a chipset; a power management circuit (PMC); one or more control lines coupled between the chipset and the PMC, wherein the chipset is configured to generate control signals and provide the control signals to the PMC wherein the control signals carry configuration information as one or more digitally controlled levels (DCL) signals.

In embodiments, the PMC comprise a finite state machine (FSM) and the chipset comprises means for reconfiguring an order of states in the FSM.

In embodiments, the means for reconfiguring an order of states in the FSM comprises a MIPI RFFE serial communication bus coupled to a register and wherein the FSM order can be reconfigured by a register write operation.

In accordance with a still further aspect of the concepts described herein, a method comprises providing one or more digital control level (DCL) signals from a chipset to a PMC over at least two signal lines; and modifying a finite state machine (FSM) sequence in the PMC by changing a value of an auxiliary signal on at least one auxiliary line coupled between the chipset and the PMC.

In embodiments, in response to changing a value of an auxiliary signal on at least one of the one or more auxiliary lines, an FSM sequence is changed from a first sequence of FSM states to a second different sequence of FSM states.

In embodiments, the method further comprises encoding the DCL signals to reject errors.

In accordance with a still further aspect of the concepts described herein, a system comprises: a baseband chipset comprising: encoder configured to receive digital control logic (DCL) information and configured to generate one or more encoded DCL signals at an output thereof; a modulator having an input coupled to the output of the encoder, the modulator configured to receive one or more encoded DCL signals from the encoder and modulate the encoded DCL signals provided thereto; an upconverter having an input coupled to an output of the encoder, the upconverter configured to convert modulated encoded DCL signals to an intermediate frequency (IF) signal; and a multiplexer having a first input coupled to the output of the upconverter and configured to receive one or more modulated, encoded DCL IF signals, having a second input configured to receive one or more IQ signals and having a third input configured to receive one or more control signals, the multiplexer configured to multiplex the one or more modulated, encoded DCL IF signals, the one or more IQ signals and the one or more control signals; a power management circuit (PMC); and a transmission line coupled between the baseband chipset and the PMC, the RF transmission line configured to propagate the multiplexed one or more modulated, encoded DCL IF signals, the one or more IQ signals and the one or more control signals between the baseband chip set and the PMC.

In embodiments, the RF head is a millimeter wave head.

In embodiments, the encoder is configured to receive auxiliary signals and to generate one or more encoded auxiliary signals.

In embodiments, the modulator is configured to modulate the encoder output signal using quadrature amplitude modulation (QAM). In embodiments, the modulator is configured to modulate the encoder output signal using quadrature amplitude modulation (QAM) before upconversion to the IF signal and multiplexing with the pre-existing IQ and control signals. In embodiments, the modulator is configured to modulates the encoder output signal using direct encoding. In embodiments, the modulator is configured to modulates the encoder output signal using direct encoding before upconversion to the IF signal and multiplexing with the pre-existing IQ and control signals.

In embodiments, the RF head comprises a demultiplexer having an input coupled to the RF transmission line, the demultiplexer configured to receive the multiplexed one or more modulated, encoded DCL IF signals, the one or more IQ signals and the one or more control signals from the baseband chip set and having a first demultiplexer output, a second demultiplexer output configured to provide a first one of IQ and control signals and a third demultiplexer outputs configured to provide a second one of IQ and control signals.

In embodiments, the RF head comprises a downconverter having an input coupled to the first output of a demultiplexer and configured to receive one or more modulated, encoded DCL IF signals.

In embodiments, the RF head comprises a demodulator having an input coupled to an output of a downconverter and the demodulator is configured to demodulate modulated signals provided thereto and provide a demodulated signal at an output thereof.

In embodiments, the RF head comprises a decoder having an input coupled to an output of a demodulator and the decoder is configured to decode the signals provided thereto and provide decoded signals at an output thereof to provide individual DCL signals.

In embodiments, the RF head comprises a PMC configured to receive DCL information (e.g., DCL signals). In embodiments, DCL information and/or comprises discrete supply level and control information (e.g. discrete supply level and control information signals).

In embodiments, the control signals comprise packet-based control signals.

In embodiments, the RF head comprises the RF transmission line corresponds to one of: a coaxial transmission line; a waveguide transmission line; a strip transmission line; and an optical link In embodiments, the system further comprises a multiplexer configured to encode the DCL information on the RF transmission line In embodiments, the chipset comprises an encoder configured to encode the DCL information prior to transmission from the chipset to the RF head.

In embodiments, the encoder is configured to encode a plurality of DCL streams thereby resulting in an increased number of possible output states.

In embodiments, the DCL information is tri-state encoded. In embodiments, tri-state encoding comprises: in response to a DCL value being unchanged, encoding a zero; in response to a DCL value being decremented, encoding one; and in response to a DCL value being incremented, encoding a two.

In embodiments, an output of the encoder is modulated before up conversion to an intermediate frequency and multiplexed with pre-existing intermediate frequency signals on the RF transmission line such that a single modulated intermediate frequency signal is provided between the chipset and the PMC.

In embodiments, a single modulated intermediate frequency signal is de-multiplexed at the RF head, down converted from the intermediate frequency, and de-coded back into individual DCL streams for use at a PMC.

In embodiments, the DCL information is directly encoded. In embodiments, the DCL information is encoded using quadrature amplitude modulation (QAM).

BRIEF DESCRIPTION OF THE DRAWINGS

The foregoing features may be more fully understood from the following description of the drawings in which.

DETAILED DESCRIPTION

Figure 1:
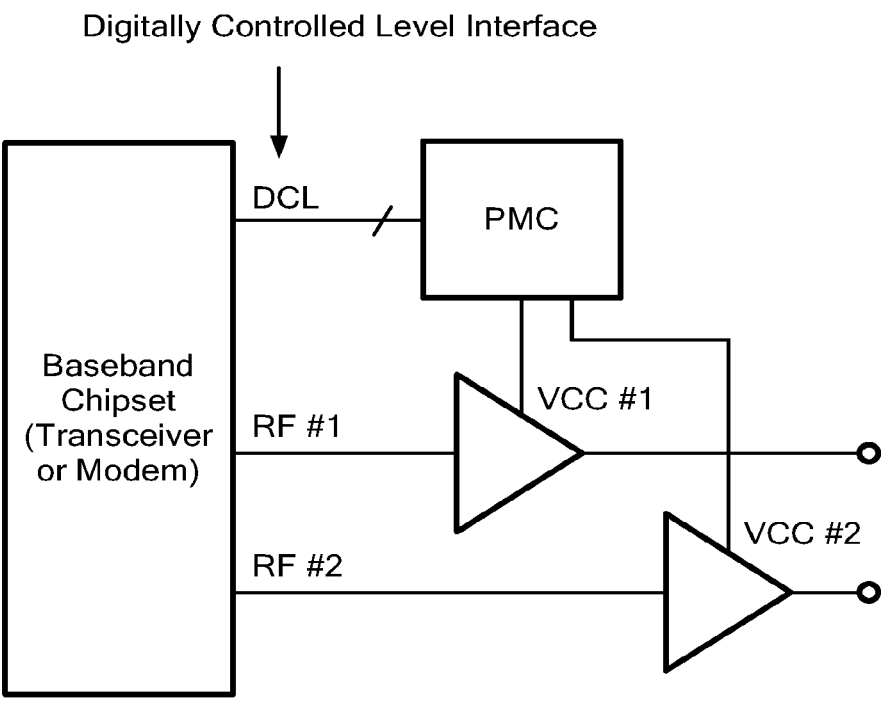
FIG. 1 is a block diagram of an illustrative radio frequency (RF) power amplifier (PA) system having a digitally controlled level (DCL) interface.

Referring now to FIG. 1, a radio frequency (RF) transmit system includes a baseband chipset having one or more RF outputs at which RF signals may be provided to one or more (or a corresponding number of) RF amplifiers. The baseband chipset typically includes a transceiver and/or a modem. In the illustrative embodiment of FIG. 1, the chipset can be provided having two RF outputs which are coupled to respective ones of two RF amplifiers. In embodiments, one, some or all of the chipset RF outputs may be coupled to one, two or more RF amplifiers.

The baseband chipset further includes a control terminal coupled to a power management circuit (PMC). The baseband chipset generates control signals (or more generally, signals which provide control information) which may be provided over a wired or wireless signal path to an input of the power management circuit (PMC). Control information includes but is not limited to configuration such as configuration of multi-pulse transitions, configuration of techniques trading RxBN for efficiency performance, configuration of general-purpose switches, configuration of techniques trading output power capability for efficiency, configuration of average power tracking operation, and configuration of mode transitions. Significantly, the control information may be provided as one or more digitally controlled levels (DCL) signals. Thus, it should be understood that the system uses digital signaling in place of or in addition to analog signaling. This approach (i.e. the use of DCL signals) supports higher bandwidth data transmission and enables a baseband chipset to operate with more PAs than an analog equivalent.

Conventional differential analog signaling requires an envelope digital-to-analog converter (DAC) for each PA output on the baseband chipset. Implementation power and size of the envelope DAC grow with increasing bandwidth and multiply with the number of independent PAs supported.

The DCL approach described herein replaces the envelope DAC with a digital signal output driver. Such digital signal output drivers are physically smaller (and in some case substantially physically smaller) than DACs and consume less power (and in some cases substantially less power) than DACs. Operation at very high bandwidth is the intended use for a digital signal output driver. Thus, the DCL approach supports the use of multiple PAs (i.e. allows a baseband chipset to be used with multiple PAs) and also supports supply modulation for IQ signals having higher bandwidth than can be supported by the equivalent analog supply modulation system.

Figure 4:
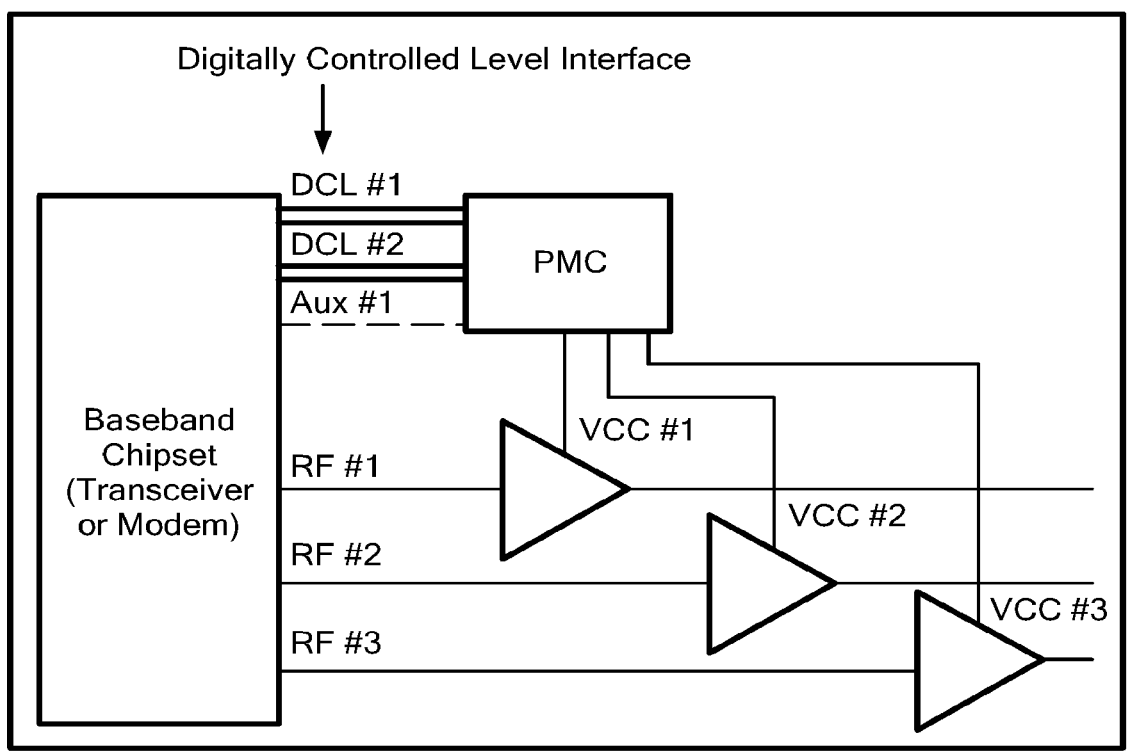
FIG. 4 is a block diagram of an alternate embodiment of an illustrative RF power amplifier system having a DCL interface.

In embodiments, the DCL signal may be provided from the baseband chipset to the PMC over a signal path comprised of two or more electrical connections. The PMC has one or more outputs. Each of the one or more PMC outputs is coupled to a bias terminal (e.g. a supply terminal) of at least one RF amplifier. In the illustrative embodiment of FIG. 1, each PMC output is coupled to a respective one of the two RF amplifiers. It should, of course be appreciated, that in other embodiments a single PMC output may be coupled to multiple RF amplifiers (e.g. a single PMC output may be coupled to supply terminals of multiple RF amplifiers). In embodiments each pair of DCL signals serves a unique PMC output such that a two-output configuration (e.g. as shown in FIG. 4) requires a total of four DCL signal connections.

Each DCL input may be referred to as a logical supply modulator, and each VCC output may be referred to as a physical supply modulator. A logical supply modulator carries with it all configuration for the physical supply modulator such as configuration of multi-pulse transitions, configuration of general-purpose switches related to that output, configuration of average power tracking and other mode transitions, and so on. The mapping from logical to physical supply modulators can be reconfigured programmatically, such that any input can control any output. This is especially useful when multiple baseband chipsets must have control over the same PA hardware (e.g. logical supply modulators must be hard wired to a given baseband chipset) or a single baseband chipset must have control over many different PA outputs under different circumstances. Additionally, this reconfiguration allows the number of DCL inputs to be smaller or larger than the number of VCC outputs.

In response to the PMC receiving DCL control signals, the PMC provides at outputs thereof a bias signal (e.g. a supply voltage). The PMC output signals are coupled to bias terminals of the respective RF amplifiers. Thus, the PMC may provide one or several RF amplifiers with independently modulated supply voltage at discrete levels.

For example, the use of DCL signals significantly simplifies connection of the baseband chipset to PMC for scenarios requiring multiple PAs to operate simultaneously, such as is the case with multiple-input, multiple output (MIMO) systems, uplink carrier aggregation systems, array beamforming systems.

Further still, the DCL approach has a simple transmit-side implementation on the baseband chipset. For example, in 5G designs across sub-6 GHz frequency bands (so-called "FR1 applications"), the DCL approach may be implemented using conventional driver circuits (e.g. conventional single-ended complementary metal oxide semiconductor (CMOS) driver circuits).

The DCL approach may result in a reduction in chipset complexity, size, and power compared with chipset complexity, size, and power required using analog signaling techniques which require the use of low-noise DACs. For example, in a 5G FR1 application supporting low band with maximum channel bandwidth of 20 MHz, the baseband chipset implementation of DCL is less than 1% of the size of envelope DAC implementation, and power consumed by the chipset implementation of DCL is less than 1% of the power consumed by the envelope DAC implementation. The size, power, and noise considerations associated with transmission of analog envelope signaling make it impractical at bandwidths approaching and exceeding 100 MHz. 5G NR solutions require wide bandwidths; including the 5G NR FR1 high- and ultra-high bands where bandwidths currently reach to 100 MHz and beyond with carrier aggregation, and as well as 5G NR FR2 MMW bands where bandwidths currently reach to 400 MHz, or to 800 MHz with carrier aggregation.

The DCL technique may be implemented using only signal lines (i.e., without any clock lines). The two signal lines of FIG. 2 therefore both transmit signal, and neither operates as a traditional periodic clock. Implementation without clock lines avoids EMI issues that can be caused by a high-frequency periodic clock signal for noise-sensitive radio components including but not limited to RF amplifiers and RF mixers. Furthermore, in a two-line implementation, it may be desirable that only one DCL signal line transitions per chipset IQ clock cycle, so that transition edges are synchronized with IQ samples. Thus, the edges of signals (e.g. pulses or bits) on the signal lines may be used to communicate timing information.

In the DCL approach as few as two signal lines may be used between a baseband chipset and a PMC to represent an infinite number of PMC output states or functions. This is achieved through the use of an internal finite state machine at the PMC as described below in conjunction with FIGS. 2 and. 3.

The use of very few signal lines between the baseband chipset to a PMC is desirable, and in some cases highly desirable, as it makes routing of signal paths simpler than in other approaches, resulting in a relatively simple printed circuit board (PCB) manufacturing process. In this example embodiment only two signals lines per simultaneously active PMC output are used. It should, of course, be appreciate that in some embodiments, more than two signal lines may be used. Nevertheless, reducing the number of signal lines is advantageous for at least the reasons stated above, and may be particularly important in those applications in which a plurality of RF amplifiers is coupled to the same PMC. As will be discussed further below, in embodiments in which the PMC is in the RF head, use of a transmission line (e.g. a coaxial transmission line) coupled between a chipset and the RF head may be a preferred approach.

In operation, signal line transitions advance a finite state machine in the PMC to control the PMC output state and PMC functional modes such as high-power active mode (normal operation intended for high PA output power which supports high-current output voltage supply to PAs), low-power active mode (normal operation intended for low PA output power which supports low-current output voltage supply to PAs with improved PMC efficiency), standby mode (inactive mode intended for use when PAs are not turned on in which PMC consumes low quiescent current but can rapidly return to active mode), etc.

Figure 3:
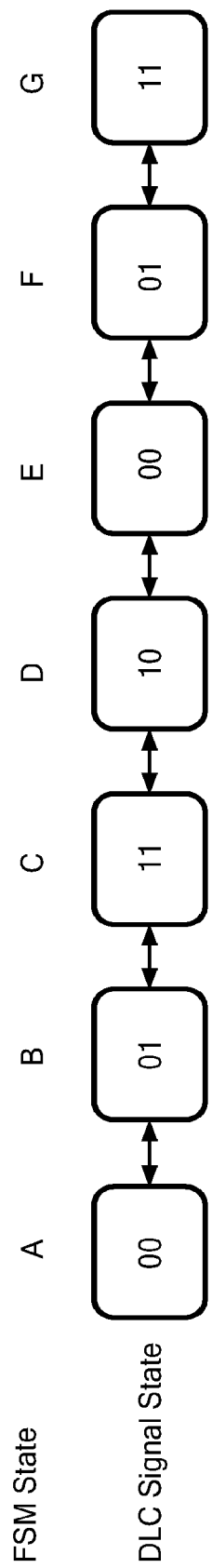
FIG. 3 is a diagram of an illustrative finite state machine (FSM) which may be implemented in the PMC.

In embodiments, the system may optionally include one or more auxiliary lines as shown in FIG. 1. The values of signals (referred to as "auxiliary signals") on the one or more auxiliary lines determine the mapping of DCL states to corresponding finite state machine (FSM) states for the following transition. Without any auxiliary lines (or with an auxiliary line in the "zero" value as shown in FIG. 3) the FSM may only be advanced to adjacent states. E.g. Given a current state "B", the FSM can be advanced only to states "A" or "C". It should be appreciated that the auxiliary signal can be configured to transition at substantially the same point in time as the DCL signal or before the transition of the DCL signal. The DCL signal edges can be used as a timing reference to indicate when a state change should take place, while auxiliary signals are configured before the DCL signal transition takes place. When described in the limit as a parallel data bus, the DCL signals can be a clock (i.e., a timing reference that indicates when data should be latched), while auxiliary lines can serve as the data. Any number of auxiliary lines may be added to expand throughput for the DCL link.

Figure 2:
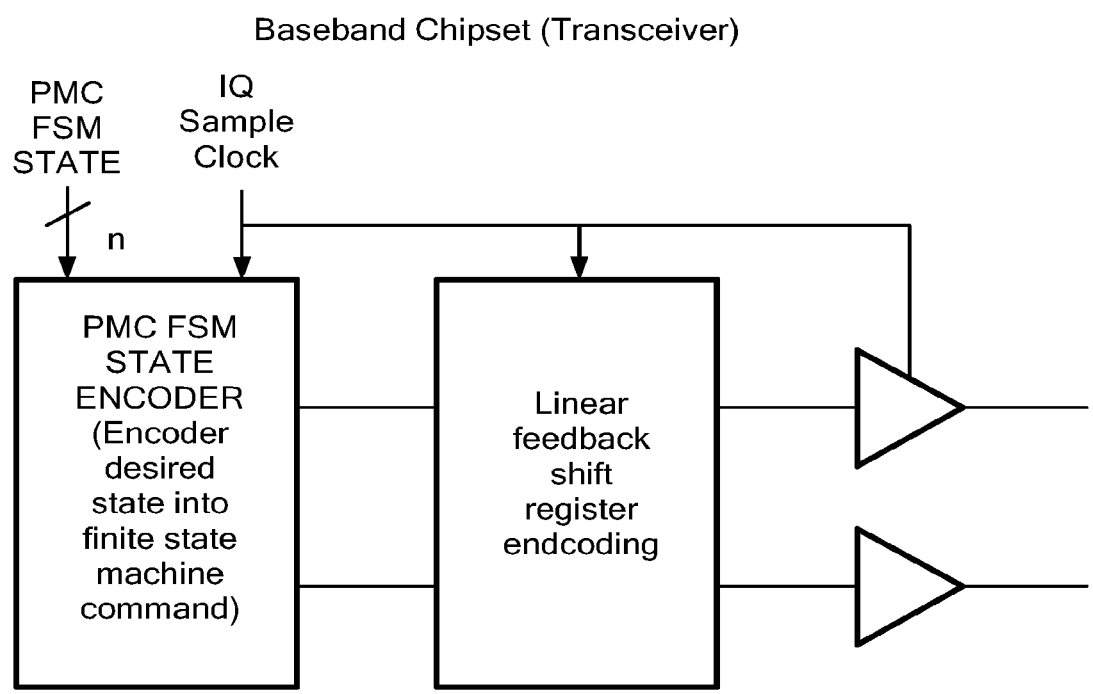
FIG. 2 is a block diagram of the DCL signal path for an illustrative baseband chipset.

Referring now to FIG. 2, a baseband chipset includes a PMC state encoder. The encoder receives a desired PMC FSM state from the baseband chipset (e.g. "ABCDEFG" from FIG. 3). in the form of an n-bit digital signal. The digital PMC state signal may be provided to the encoder over a plurality of signal paths. In the example of FIG. 2, digital PMC state signal is provided over n signal paths (i.e. the n-bit digital signal is provided in parallel to the encoder). The encoder and linear feedback shift register (LFSR encoder) each receive a clock signal.

In response to a PMC state signal provided thereto, the encoder encodes the PMC state signal and provides an encoded state signal to the linear feedback shift register (LFSR) based encoder. The LFSR-based encoder (hereafter "LFSR") receives the encoded signal and applies additional encoding and provides output signals on one or more output signal paths. In embodiments, the output signal paths are coupled through buffer circuits which are latched using the clock signal. The clock is NOT transmitted from chipset to PMC, but edges of the two DCL signal paths are aligned with clock edges.

Referring now to FIG. 3, a state diagram illustrates an example of PMC internal finite state machine implementation. As noted above, in the DCL approach as few as two electrical connections (and a single ground return path) may be used between a baseband chipset and a PMC to represent many PMC output states or functions. In such a case only transitions between adjacent states is permitted.

As illustrated in FIG. 3, a series of DCL states may be used to advance a finite state machine (FSM) in the PMC to control the PMC output state and optionally control one or more PMC functions. DCL state "10" always forces FSM state "D." Some states, e.g. B, C, D, E, F, G indicate PMIC "active mode" configuration and specify an output voltage level command. State A indicates a PMIC configuration, (e.g. "Standby").

As shown in the example embodiment of FIG. 3, Gray encoding may be applied such that only one of the two bits transitions at a time. Other coding techniques may, of course, also be used.

In the example of illustration of FIG. 3, DCL states change one bit at a time—i.e. from 00 to 01 to 11 to 10 to 00 to 01 to 11. Thus, only one signal line transitions at a time.

| DCL State | FSM state |
|---|---|
| 00 | A |
| 01 | B |
| 11 | C |
| 10 | D |
| 00 | E |
| 01 | F |
| 11 | G |

In embodiments, the DCL may be further encoded to reject errors and to control multiple PMC functions. For example, the DCL signal may be further encoded to control communication of: (a) discrete PMC output changes such as voltage level; (b) PMC mode changes, such as entering low power mode during TDD receive slots; and (c) control of low-power mode efficiency optimization.

Figure 5:
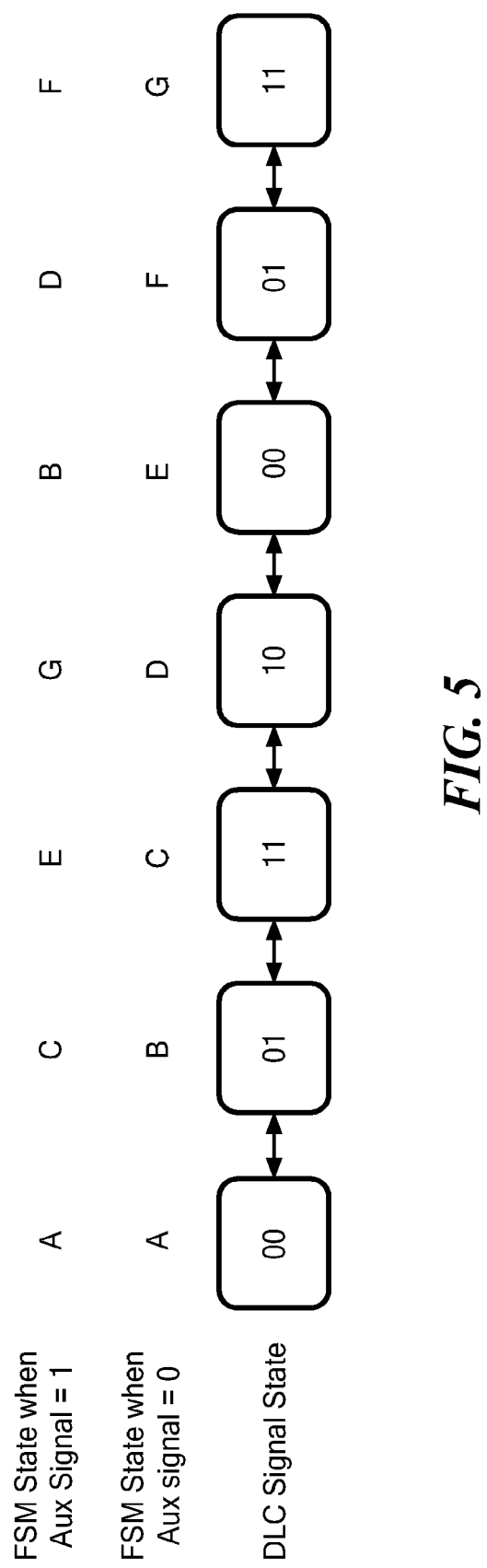
FIG. 5 is a diagram of an illustrative finite state machine (FSM) which utilizes an auxiliary signal and which may be implemented in a power management circuit (PMC)

Further still the DCL signal may be encoded (or further encoded—i.e. further to the PMC function control encoding) for security reasons and to prevent misuse. For example, a linear shift feedback register (LFSR) may be used at both chipset and PMC sides to encode and decode the DCL as shown in FIG. 5. In this way. a sequence of DCL transitions coming from the baseband chipset cannot be decoded without knowledge of the LFSR tap and seed configuration, and similarly a desired sequence of DCL bits cannot be synthesized without knowledge of the LFSR tap and seed configuration. Such security/misuse encoding may make it difficult (and ideally prevent), for example, reverse engineering of IP realized in the PMC or the baseband chipset. Depending on implementation, LFSR encoding is also useful to randomize content of the DCL signals and avoid unwanted periodicity for some signals which could result in electro-magnetic interference (EMI) with other of the system's components or signals.

Referring now to FIG. 4, a radio frequency (RF) transmit system includes a baseband chipset (typically a transceiver or modem) having three RF outputs at which RF signals may be provided to respective ones of three RF amplifiers, which may for example, be provided as RF power amplifiers (PAs).

The baseband chipset is coupled to a power management circuit (PMC) via one or more control signal paths (illustrated in FIG. 4 as Digital Control Interface signal paths DCL #1, DCL #2) and optionally one or more auxiliary signal paths (with only one such auxiliary path being shown in FIG. 4 and illustrated in FIG. 4 as Aux #1). The control and auxiliary signal paths may be provided as wired and/or wireless signal paths. The baseband chipset can generate control signals (referred to herein as DCL signals) which may be provided over the one or more wired or wireless control signal paths to an input of the power management circuit (PMC). The control information may be provided as one or more DCL signals. Thus, as above in FIG. 1, in this illustrative embodiment communication between the baseband chipset and the PMC is accomplished via digital signaling.

In embodiments, the DCL signal may be provided from the baseband chipset to the PMC over a signal path comprised of two or more electrical connections. In the illustrative embodiment of FIG. 4, two pairs of DCL signal paths (denoted DCL #1 and DCL #2 in FIG. 4) each of which is comprised of two electrical connections couple the baseband chipset to the PMC (i.e. two signal lines form the signal path which couple the baseband chipset to the PMC).

Also in the illustrative embodiment of FIG. 4, the PMC has three outputs each of which is coupled to a bias terminal (e.g. a supply terminal) of a respective one of three RF amplifiers (which may, for example, be provided as RF power amplifiers).

It should, of course be appreciated, that in other embodiments a single PMC output may be coupled to multiple RF amplifiers (e.g. a first PMC output may be coupled to supply terminals of two of the three RF amplifiers in FIG. 4 and a second PMC output may be coupled to the supply terminal of a third one of RF amplifiers in FIG. 4. In embodiments, each pair of DCL signals serves a unique PMC output such that simultaneous supply modulation of two of the three outputs in the three-output configuration shown in FIG. 4 requires a total of four DCL signal connections. It should be appreciated that additional outputs in excess of the number of inputs (e.g. output #3 in this configuration of FIG. 4) may simultaneously source power to a PA load even though no unique DCL command is available. PMC ICs often employ a communication channel (other than DCL) which is used for configuration and control of the device. Examples of such channels include but are not limited to SPI, I2C, or MIPI® Alliance (MIPI) RF front-end control Interface (RFFE). Command and/or control information for PMC output #3 may be transmitted or otherwise provided to the PMC over any such alternate channels-to command or otherwise cause the PMC output #3 to produce a fixed output voltage.

Figure 9:
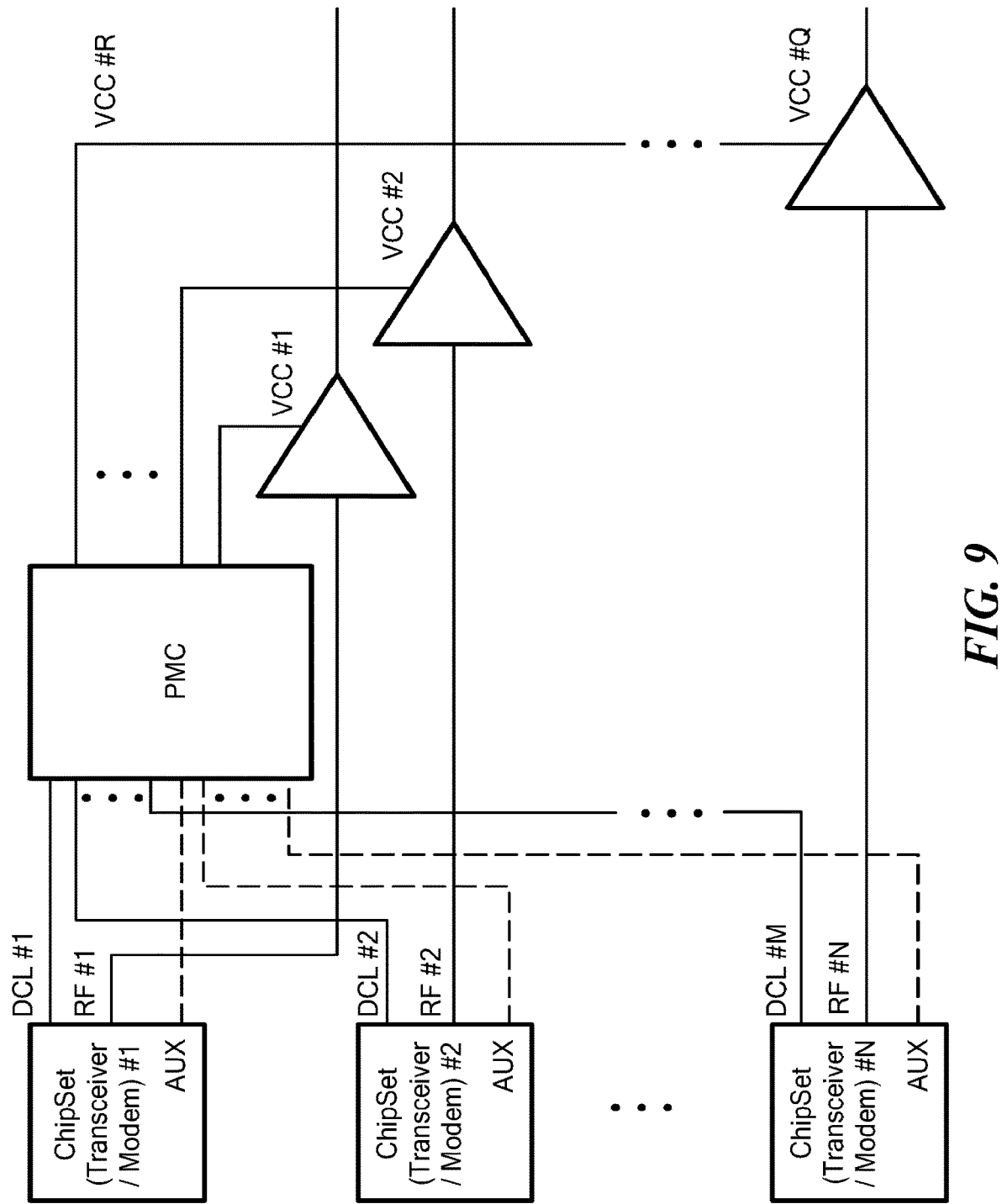
FIG. 9 is a block diagram of an alternate embodiment of an illustrative RF power amplifier system having a DCL interface.

As noted above, each DCL input to the PMC may be referred to as a logical supply modulator, and each VCC output for the PMC to the supply terminals of the RF amplifiers is referred to as a physical supply modulator. A logical supply modulator carries with it all configuration for the physical supply modulator such as configuration of multi-pulse transitions, configuration of general-purpose switches related to that output, configuration of average power tracking and other mode transitions, and so on. The mapping from logical to physical supply modulators can be reconfigured programmatically, such that any input can control any output. This is especially useful when multiple baseband chipsets must have control over the same PA hardware (e.g. logical supply modulators must be hard wired to a given baseband chipset) or a single baseband chipset must have control over many different PA outputs under different circumstances as illustrated in FIG. 9. Additionally, this reconfiguration allows the number of DCL inputs to be smaller than or larger than the number of VCC outputs.

In response to the PMC receiving DCL control signals, the PMC provides at outputs thereof a bias signal (e.g. a supply voltage). The PMC output signals are coupled to bias terminals of the respective RF amplifiers. Thus, the PMC may provide one or several RF amplifiers with independently modulated supply voltage at discrete levels.

The use of DCL signals significantly simplifies connection of the baseband chipset to PMC for scenarios requiring multiple PAs to operate simultaneously, such as is the case with multiple-input, multiple output (MIMO) systems, uplink carrier aggregation systems, array beamforming systems and other systems.

Further still, the IC transmitting the DCL signal (typically a baseband chipset) has a very simple implementation compared with the equivalent transmit-side implementation for analog signaling. For example, in a wide variety of applications including 5G designs across both FR1 and FR2 frequency bands currently defined up to 800 MHz bandwidth, the DCL approach may be implemented using conventional driver circuits (e.g. conventional single-ended complementary metal oxide semiconductor (CMOS) driver circuits).

The DCL technique may be implemented using only signal lines (i.e., without any clock lines). The signal lines of FIG. 4 therefore both transmit signal, and do not operate as a traditional periodic clock. As noted above, implementation without clock lines avoids EMI issues that can be caused by a high-frequency periodic clock signal for noise-sensitive radio components including but not limited to RF amplifiers and RF mixers. As noted above, even in embodiments which comprise multiple signal lines, it may be desirable that only one DCL signal line transitions per chipset IQ clock cycle, so that transition edges are synchronized with IQ samples. Thus, the edges of signals (e.g. pulses or bits) on the signal lines may be used to communicate timing information.

In the DCL approach as few as two electrical connections (i.e. signal lines) (and a single ground return path) may be used between a chipset and a PMC to represent an infinite number of PMC output states or functions. This is achieved through the use of an internal finite state machine at the PMC as discussed above in conjunction with FIGS. 2 and 3.

The use of very few electrical connections between the baseband chipset and the PMC is highly desirable as it makes routing of signal paths simpler than in other approaches, resulting in a relatively simple printed circuit board (PCB) manufacturing process. In the embodiment of FIG. 4, only two electrical connections between the baseband chipset and the PMC per simultaneously active PMC output are used. This may be particularly important in those applications in which a plurality of RF amplifiers are coupled to the same PMC (e.g. as illustrated in FIGS. 1, 4, and 8-10). Use of such digital control lines instead of noise-sensitive analog control lines can also add a degree of flexibility for improved industrial design, allowing RF amplifiers to be placed in a convenient location which may be distant from the chipset and other RF amplifiers. Freedom to place RF amplifiers away from the chipset and from other amplifiers is increasingly important for 5G NR applications where the number of unique RF amplifiers continually grows to address new frequency spectra.

In operation, signal line transitions advance a finite state machine in the PMC to control the PMC output state and PMC functional modes such as high-power active mode (normal operation intended for high PA output power which supports high-current output voltage supply to PAs), low-power active mode (normal operation intended for low PA output power which supports low-current output voltage supply to PAs with improved PMC efficiency), standby mode (inactive mode intended for use when PAs are not turned on in which PMC consumes low quiescent current but can rapidly return to active mode), etc.

Figure 8:
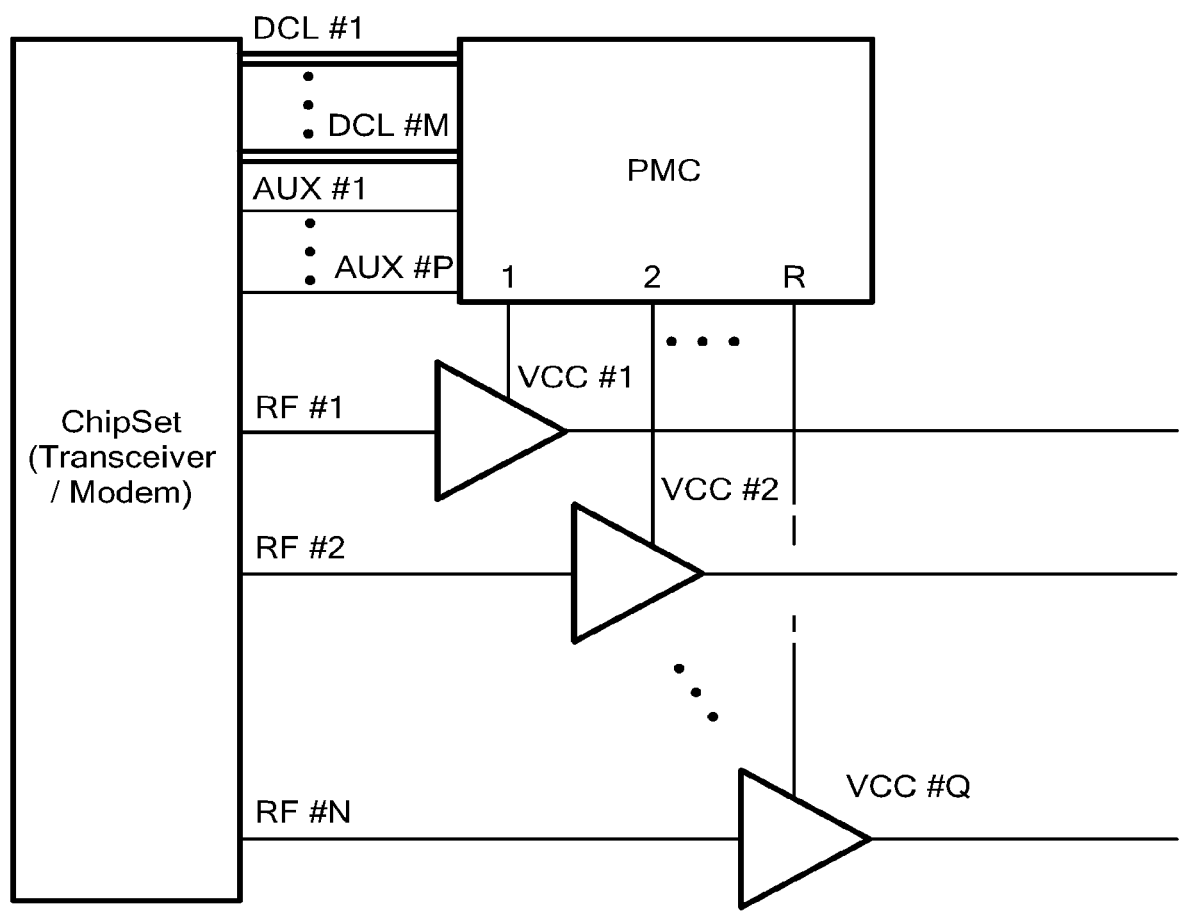
FIG. 8 is a block diagram of an alternate embodiment of an illustrative RF power amplifier system having a DCL interface.
Figure 10:
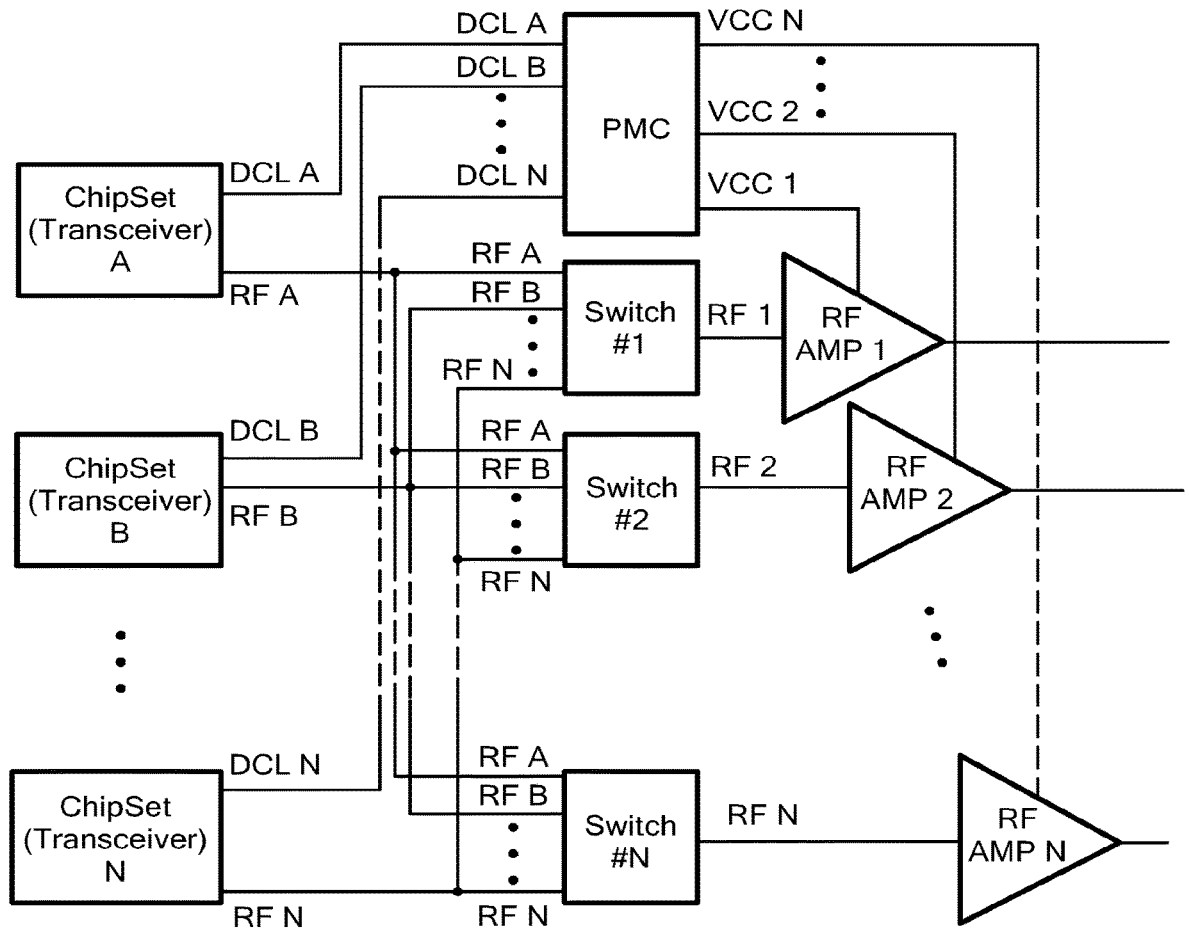
FIG. 10 is a block diagram of an alternate embodiment of an illustrative RF power amplifier system having a DCL interface.

As noted above, in embodiments, the system may optionally include one or more auxiliary lines (as shown in the example embodiment of FIG. 4 as well as in the example embodiments of FIGS. 8-10). The values of signals (referred to as "auxiliary signals") on the one or more auxiliary lines determine the mapping of DCL states to corresponding finite state machine (FSM) states for the following transition.

In embodiments which do not include auxiliary lines (e.g. see the example circuit of FIG. 1 and the state diagram of FIG. 3), given a current state "B", the FSM can be advanced only to states "A" or "C" (as illustrated in FIG. 3).

The addition of one or more auxiliary lines, however, provides the FSM with the ability to move to non-adjacent states. For example, when the auxiliary signal on the auxiliary line of FIG. 1 is set to a first value (e.g. "1"), the FSM can advance from the current state "B" to next states "A" or "E" as illustrated in FIG. 5.

Another benefit of the auxiliary line is the ability to change the FSM state sequence (sometimes referred to herein as a "sequence of FSM states" or more simply as the "FSM sequence" or "the order of the FSM states"). Using the auxiliary line (i.e. by changing the value of an auxiliary signal on at least one of the one or more auxiliary lines) the FSM sequence may be modified. For example, the illustrative FSM sequence shown in FIG. 3 may be modified (or changed) from "A-B-C-D-E-F-G" (e.g. when a signal on an auxiliary line has a first value such as the signal on an auxiliary line having a logic low value such as a voltage corresponding to a logic low value—e.g. a logic low value as defined in the logic family being used in the circuit) to "A-C-E-G-B-D-F" (e.g. when a signal on the same or a different auxiliary line has a second, different value such as the signal on the auxiliary line having a logic high value such as a voltage having a logic high value—e.g. a logic high value as defined in the logic family being used in the circuit).

It should be noted that changing the FSM sequence can be realized (i.e. implemented) by other means as well, such as by sideline communication. Such communication is commonly implemented in mobile PMC solutions as a MIPI RFFE serial communication bus. In such a case, the FSM order can be reconfigured by a register write operation.

In embodiments, the DCL may be further encoded to reject errors. Gray encoding may be applied such that only one of the two bits transitions at a time. Gray coding reduces (and ideally eliminates) errors which occur when multiple signal lines switch simultaneously. Other coding techniques may, of course, also be used.

In addition to having a simple transmit-side implementation, the DCL signal also has a simple implementation on the receive (PMC) side. For example, conventional digital buffer circuits may be used at inputs as compared to the need for a noise rejection filter for systems which utilize an analog signaling approach.

Referring now to FIG. 5, a state diagram illustrates an example of PMC internal finite state machine implementation. As noted above, in the DCL approach as few as two electrical connections (and a single ground return path) may be used between a baseband chipset and a PMC to represent many PMC output states or functions. In such a case only transitions between adjacent states is permitted.

As illustrated in FIG. 5, a series of DCL states may be used to advance a finite state machine (FSM) in the PMC to control the PMC output state and optionally control one or more PMC functions. DCL state "10" always forces FSM state "D" for auxiliary signal=0 or "G" for auxiliary signal=1. Some states, e.g. B, C, D, E, F, G indicate PMIC "active mode" configuration and specify an output voltage level command. State A indicates a PMIC configuration, (e.g. "Standby").

As shown in the example embodiment of FIG. 5, Gray encoding may be applied such that only one of the two bits transitions at a time. Other coding techniques may, of course, also be used.

In the example of illustration of FIG. 5, DCL states change one bit at a time—i.e. from 00 to 01 to 11 to 10 to 00 to 01 to 11. Thus, only one signal line transitions at a time.

Regardless of how the values of the auxiliary signals on the one or more auxiliary signal lines are selected or set, such shifting on the one or more auxiliary lines may change the mapping of DCL states to corresponding finite state machine (FSM) states for the following transition. For example, as illustrated in FIG. 5, with the auxiliary signal having a first value (e.g. Aux signal=0), the mapping of DCL states to FSM states is as shown in Table 1.

TABLE 1

| DCL State | AUX signal | FSM state |
| --- | --- | --- |
| 00 | 0 | A |
| 01 | 0 | B |
| 11 | 0 | C |
| 10 | 0 | D |
| 00 | 0 | E |
| 01 | 0 | F |
| 11 | 0 | G |

However, if the auxiliary signal is provided having a second, different value (e.g. Aux signal=1), the mapping of DCL states to FSM states is as shown in Table 2.

TABLE 2

| DCL State | AUX signal | FSM state |
| --- | --- | --- |
| 00 | 1 | A |
| 01 | 1 | C |
| 11 | 1 | E |
| 10 | 1 | G |
| 00 | 1 | B |
| 01 | 1 | D |
| 11 | 1 | F |

In embodiments, the DCL may be further encoded to reject errors. In the embodiment of FIG. 5, for example, it should be noted that the DCL signal state "00" can represent either state "A" or state "D" when Aux signal is low. Distinguishing among "A" and "D" requires a constant knowledge of state history (e.g. was the previous state "C" or "E", or was the previous state "B"). If that state history is corrupted by a bit error the current state cannot be correctly determined. A transition to DCL signal state "10" when Aux signal is low, however, is not ambiguous and can only represent FSM state "D". In this way transitions to state "D" will correct a bit error in the DCL signal.

The DCL signal may be further encoded to control multiple PMC functions, and can be useful to control time-critical functions for which the latency of a sideline telegram would be too long. For example, The DCL signal may be further encoded to control communication of: (a) discrete PMC output changes such as voltage level; (b) PMC mode changes, such as entering low power mode during TDD receive slots; and (c) control of low-power mode efficiency optimization.

The 5G NR application can define several challenging scenarios for time-domain duplexing mode, in which the same frequency spectrum is shared for transmit and receive at different time intervals. 5G NR configurations optimized for low-latency and high reliability may make use of "mini-slots" and may have wide sub-carrier spacing, which lead to brief and erratic transmit time intervals to receive intervals. In such instances it may become impractical to turn off the RF amplifier with sideline communication in the customary way (e.g. by MIPI® RFFE telegram) thereby requiring the RF amplifier to continue dissipating quiescent current even during the receive interval when the PA is not in use. DCL control can command or otherwise cause the PMC to enter a low power state and return to the full power state with just nano-seconds of latency. This is one advantage permitting substantial power savings in such 5G NR scenarios.

Figure 6:
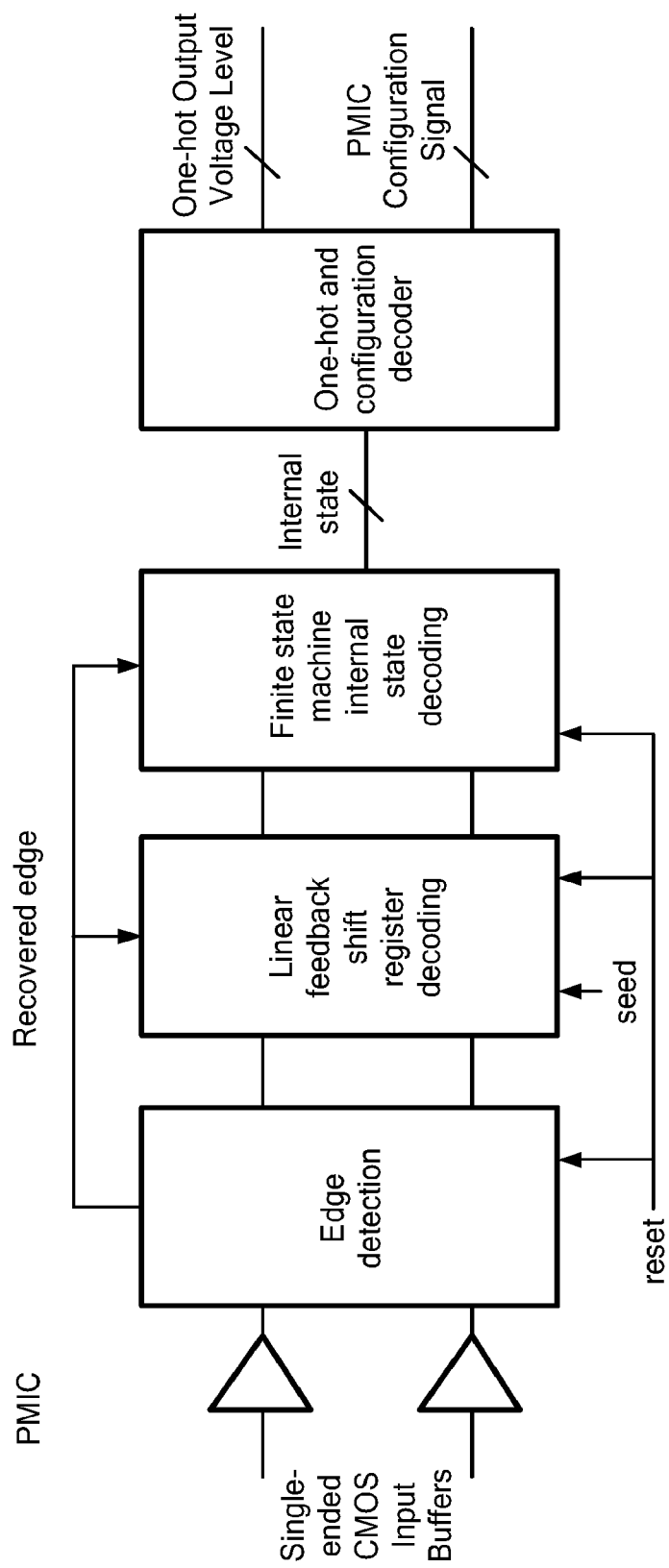
FIG. 6 is a block diagram of the DCL signal path for an illustrative PMC which utilize a DCL control in accordance with the concepts described herein.
Figure 7:
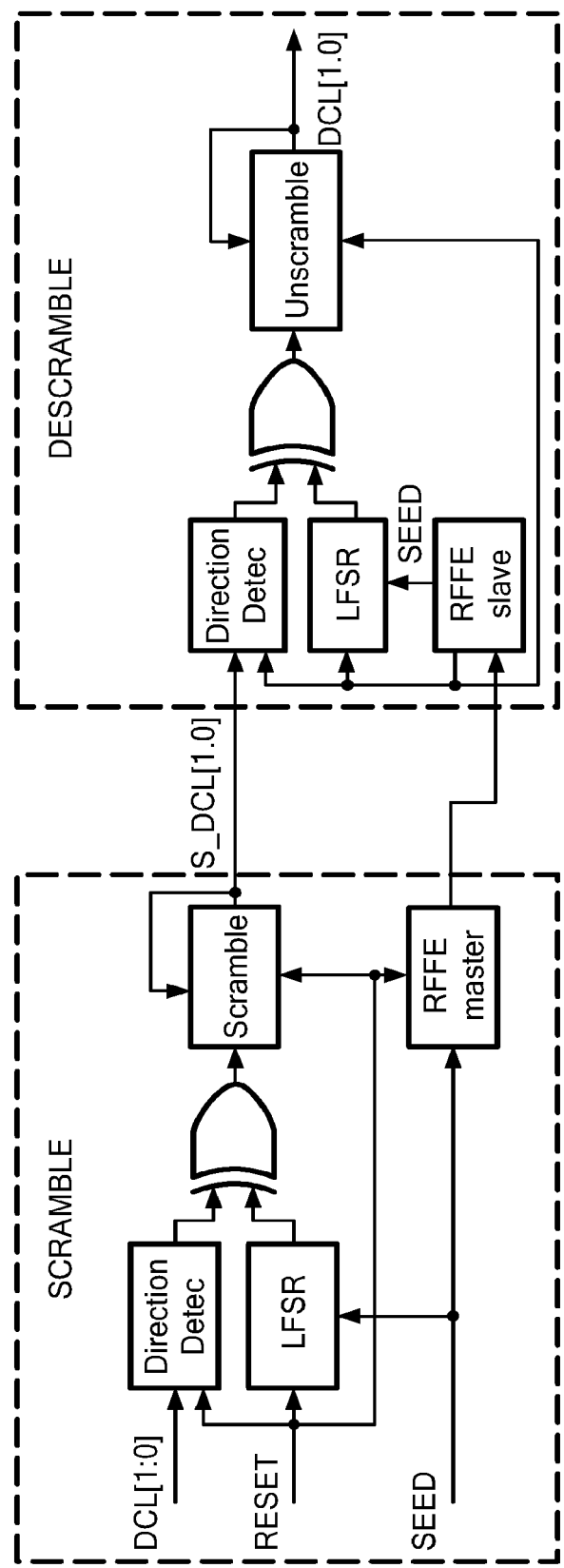
FIG. 7 is a block diagram of a scramble-descramble circuit.

Further still the DCL signal may be encoded (or further encoded—i.e. further to the PMC function control encoding) for security reasons and to prevent misuse. For example, a linear shift feedback register (LFSR) may be used at both chipset and PMC sides to encode and decode the DCL as shown in FIGS. 6 and 7. In this way, a sequence of DCL transitions coming from the baseband chipset cannot be decoded without knowledge of the LFSR tap and seed configuration, and similarly a desired sequence of DCL bits cannot be synthesized without knowledge of the LFSR tap and seed configuration. Such security/misuse encoding may make it difficult (and ideally prevent), for example, reverse engineering of IP realized in the PMC or baseband chipset.

Referring now to FIG. 6, a power management circuit includes input digital buffer circuits coupled to an edge detector which in turn is coupled to an LFSR decoder. Outputs from LFSR decoder are coupled to an FSM which decodes the desired PMC state. Outputs from the LFSR decoder are coupled to a configuration decoder. The configuration decoder receives an internal state of the FSM (one of the states shown, for example, in FIGS. 3 and 5), and determines the PMC configuration state (e.g. high-power, low-power, or standby modes) and output voltage level. Additional states may be added to control additional PMIC functions and outputs such as supporting power rails or general-purpose outputs.

The output voltage level is represented as a "one-hot" signal internal to the PMC. This representation has one bit for each state, and only the bit representing the active state is high (i.e. "hot"). Thus, the PMC avoids the situation where two bits (or two states, or two voltage levels) are simultaneously active. Thus, in the illustrative embodiment of FIG. 6, the digital buffer is followed by a DCL signal processing circuit.

It should thus be appreciated that in addition to having a simple transmit-side (baseband chipset) implementation, the DCL signal also has a simple implementation on the receive (PMC) side. For example, conventional digital buffer circuits may be used at inputs as compared to the need for a noise rejection filter for conventional systems which utilize an analog signaling approach.

In embodiments, the digital buffer may, for example, be followed by an input Schmitt trigger having threshold symmetry such that the output transitions from "0" to "1" for rising input signals at the same analog voltage level as it transitions from "1" to "0" for falling signals. Such symmetry may be desirable or even required in some cases to give rising and falling edges equal delay, preserving placement of recovered edges.

Referring now to FIG. 7, LFSR encoding of the DCL signal in the baseband chipset is achieved using the block diagram on the left. First the direction of FSM advance is detected (e.g. from "B" to "C" is "up" or "1" and "B" to "A" is "down" or "0"). The direction of FSM advance is then exclusive-OR'd with the output of the LFSR. The "scramble" block of FIG. 7 then creates the encoded "S_DCL" signal based on a look-up table using the exclusive-ORed output, unencoded DCL, and previous value of S_DCL. The procedure is reversed on the PMC to recover the original value of DCL signals.

In one embodiment the LFSR block implements a more complex pseudo-random sequence generator such as a symmetric key stream cipher. The seed (or initialization) values for both chipset and PMC must match, or the decoded PMC DCL values will not match the desired encoded chipset DCL values. The seed is generated by an outside component (e.g. a function of chipset or digital pre-distortion coefficient values) and shared with the PMC to achieve correct operation. Additionally, both the baseband chipset and PMC memories must be initialized (set to a known value) before transmitting a stream of DCL values. If the baseband chipset and PMC do not use the same seed or are not reset before transmission the DCL values at the PMC will not match the desired baseband chipset DCL values. Thus, the use of the baseband chipset with an unintended PMC, or the use of the PMC with an unintended baseband chipset, is prevented. It should, of course, be appreciated that any pseudo-random number generator may be used.

FIGS. 8-10 are directed towards alternate embodiments of RF transmit systems which include a PMC and operate in accordance with the concepts and techniques described herein.

Referring now to FIG. 8, a radio frequency (RF) transmit system includes a baseband chipset having a plurality of RF outputs (here N outputs denoted RF #1-RF #N) at which RF signals may be provided to RF amplifiers (which may, for example, be provided as RF power amplifiers). In this illustrative embodiment, RF outputs (i.e. outputs RF #1-RF #N) are provided to Q RF amplifiers. In the illustrative embodiment of FIG. 8, the number of RF outputs matches the number of RF amplifiers (i.e. N=Q). However, in embodiments it may be desirable for a single RF output of the baseband chipset to be coupled to the inputs of multiple RF amplifiers. For example, single RF output of the baseband chipset may feed RF energy to multiple RF amplifiers. In this case, the number of baseband chipset RF outputs may not match the number of RF amplifiers (i.e. N is not equal to Q). In this example, the number of RF outputs of the baseband chipset would be less than the number of RF amplifiers).

The baseband chipset further includes a plurality of control signal paths, (here M control signal paths denoted DCL #1-DCL #M) coupled to one or more power management circuits (PMC) with only one PMC being shown in FIG. 6. Control signal paths DCL #1-DCL #M may be provided as wired or wireless signal paths. The baseband chipset generates control signals which may be provided over the control signal paths DCL #1-DCL #M to one or more inputs of the PMC. Thus, control information may be provided as one or more DCL signals provided over one or more of the control signal paths DCL #1-DCL #M. As above, in this illustrative embodiment, communication between the baseband chipset and the PMC is accomplished via a digital signaling technique.

In embodiments, some or all of the M control signal paths DCL #1-DCL #M may be comprised of two or more electrical connections. Thus, the DCL signal may be provided from the baseband chipset to the PMC over a signal path comprised of two or more electrical connections.

The PMC has R outputs. In embodiments, each of the R PMC outputs may be coupled to a bias terminal (e.g. a supply terminal) of a respective one of Q RF amplifiers (i.e. R=Q). It should, however, be noted that the number of PMC outputs need not match the number of RF amplifiers (i.e. R need not equal Q). Rather, in embodiments, it may be desirable that a single PMC output be coupled to supply terminals of multiple RF amplifiers (e.g. a first one of the PMC outputs may be coupled to supply terminals of multiple ones of the N RF amplifiers). Also, a first one of the PMC outputs may be coupled to supply terminals of a first plurality of the Q RF amplifiers and a second PMC output may be coupled to the supply terminals of a second, different plurality of the Q RF amplifiers.

In embodiments, two pairs of DCL signals may serve to control two unique PMC outputs such that a configuration with two simultaneously active outputs requires a total of four DCL signal connections.

As noted above, DCL inputs to the PMC may be referred to as a logical supply modulator, and VCC outputs from the PMC to the supply terminals of the RF amplifiers may be referred to as a physical supply modulator. A logical supply modulator carries with it all configuration for the physical supply modulator such as configuration of multi-pulse transitions, configuration of general-purpose switches related to that output, configuration of average power tracking and other mode transitions, and so on. The mapping from logical to physical supply modulators can be reconfigured programmatically, such that any input can control any output. This is especially useful when it is desirable for multiple baseband chipsets to have control over the same PA hardware (e.g. logical supply modulators are hard wired to, or otherwise configured to operate with, a given baseband chipset) or it is desirable for a single baseband chipset to have control over many different PA outputs under different circumstances as illustrated in FIG. 9. Additionally, this reconfiguration allows the number of DCL inputs to the PMC to be smaller than the number of VCC outputs from the PMC (i.e. M<N).

In response to the PMC receiving DCL control signals, the PMC provides at outputs thereof a bias signal (e.g. a supply voltage). The PMC output signals are coupled to bias terminals of the respective RF amplifiers. Thus, the PMC may provide one or several RF amplifiers with independently modulated supply voltage at discrete levels.

As noted above, the use of DCL signals significantly simplifies connection of the baseband chipset to PMC for scenarios requiring multiple PAs to operate simultaneously, such as is the case with multiple-input, multiple output (MIMO) systems, uplink carrier aggregation systems, array beamforming systems and other systems.

Further still, the DCL approach has a transmit-side implementation which is relatively simple compared with conventional transmit-side implementations. For example, in 5G designs across sub-6 GHz frequency bands (so-called "FR1 applications"), the DCL approach may be implemented using conventional driver circuits (e.g. conventional single-ended complementary metal oxide semiconductor (CMOS) driver circuits).

Referring now to FIG. 9, a radio frequency (RF) transmit system includes a plurality of baseband chipsets each having one or a plurality of RF outputs. In FIG. 9, to achieve simplicity in the drawings and description, each baseband chipset is shown having only one RF output. It should be understood, however, that each baseband chipset in FIG. 9 may be the same as or similar to any of the baseband chipsets described in conjunction with FIG. 1, 2, 4 or 6-10. Thus, although each baseband chipset in FIG. 9 is illustrated as feeding a single RF amplifier, any or all of the baseband chipsets in FIG. 9 may have RF outputs which feed multiple RF amplifiers.

In this illustrative embodiment, the baseband chipsets provide DCL control signals and optionally auxiliary signals to a single PMC. As above, the DCL technique may be implemented using only signal lines (i.e., without any clock lines).

In operation, signal line transitions advance a finite state machine in the PMC to control the PMC output state and PMC functional modes such as high-power active mode (normal operation intended for high PA output power which supports high-current output voltage supply to PAs), low-power active mode (normal operation intended for low PA output power which supports low-current output voltage supply to PAs with improved PMC efficiency), standby mode (inactive mode intended for use when PAs are not turned on in which PMC consumes low quiescent current but can rapidly return to active mode), etc.

In embodiments, the system may optionally include one or more auxiliary lines. The values of the auxiliary signals on the one or more auxiliary lines determines the mapping of DCL states to corresponding finite state machine (FSM) states for the following transition. Without any auxiliary lines (as shown in FIG. 1) or with an auxiliary line having only a single value (e.g. a value of "zero" value (as shown in FIG. 3A) the FSM may only be advanced to adjacent states. For example, given a current state "B", the FSM can be advanced only to states "A" or "C".

Thus, as noted above, one benefit of including one or more auxiliary lines is that the addition of such one or more auxiliary lines provides the ability to move to non-adjacent states. For example, when the auxiliary signal on the auxiliary line of FIG. 4 is set to a first value (e.g. "1"), the FSM can advance from the current state "B" to next states "A" or "E" as illustrated in FIG. 5.

Also, use of one or more auxiliary lines provides the ability to change the FSM sequence. Using the auxiliary line (i.e. by changing the value of an auxiliary signal on at least one of the one or more auxiliary lines) the FSM sequence may be modified. For example, the illustrative FSM sequence shown in FIG. 5 may be modified (or changed) from "A-B-C-D-E-F-G" (e.g. when a signal on an auxiliary line has a first value such as the signal on an auxiliary line having a logic low value such as a voltage corresponding to a logic low value—e.g. a logic low value as defined in the logic family being used in the circuit) to "A-C-E-G-B-D-F" (e.g. when a signal on the same or a different auxiliary line has a second, different value such as the signal on the auxiliary line having a logic high value such as a voltage corresponding to a logic high value—e.g. a logic high value as defined in the logic family being used in the circuit).

It should be noted that changing the FSM sequence can be realized (i.e. implemented) by other means as well, such as by sideline communication. Such communication is commonly implemented in mobile PMC solutions as a MIPI RFFE serial communication bus. In such a case, the FSM order can be reconfigured by a register write operation.

In embodiments, the DCL may be further encoded to reject errors. Gray encoding may be applied such that only one of the two bits transitions at a time. Gray coding reduces (and ideally eliminates) errors which occur when multiple signal lines switch simultaneously. Other coding techniques may, of course, also be used.

In addition to having a simple transmit-side implementation, the DCL signal also has a simple implementation on the receive (PMC) side. For example, conventional digital buffer circuits may be used at inputs as compared to the need for a noise rejection filter for systems which utilize an analog signaling approach.

Referring now to FIG. 10, a radio frequency (RF) transmit system includes a plurality of baseband chipsets (here N baseband chipsets) each having one or a plurality of RF outputs some or all of which may be coupled to one or more RF amplifiers and one or more control lines one or all of which may be coupled to one or more PMCs. To promote clarity in the drawings and the description of the broad concepts disclosed herein, in this illustrative embodiment, each baseband chipset is shown having only a single RF output. Also, this example embodiment includes only a single PMC. As noted above, however, in embodiments, it may be desirable to include one or more of: baseband chipsets having multiple RF outputs or baseband chipsets having RF outputs coupled to multiple RF amplifiers and/or baseband chipsets coupled to multiple PMCs and/or different baseband chipsets coupled to different PMCs.

Also, in the embodiment of FIG. 10, some or all of the RF lines may be coupled to the RF amplifiers through one or more switches. With this approach, some or all of the RF signal paths from may be multiplexed between the baseband chipsets A-N and RF amplifiers 1-N (e.g. power amplifiers), so that any of the N baseband chipsets may be connected or otherwise coupled to any of the RF amplifiers via an RF signal path. In embodiments, the RF switches could be included in the baseband chipset, in the RF amplifier or may be disposed (e.g. as discrete components and/or devices) between the RF amplifiers and the baseband chipsets. It should be appreciated that each baseband chipset in FIG. 10 may be the same as or similar to any of the baseband chipsets described above in conjunction with FIGS. 1, 4 and 6-9. Thus, although each baseband chipset in FIG. 10 is illustrated as having a single output, any or all of the baseband chipsets in FIG. 10 may have multiple RF outputs some or all of which may be selectively coupled to one or multiple RF amplifiers. Also, in the embodiment of FIG. 10, (again for simplicity) auxiliary lines are not explicitly shown, but may be included in some or all of the baseband chipsets A-N.

Thus, in this illustrative embodiment, the baseband chipsets may provide DCL control signals and optionally auxiliary signals to a single PMC. In other embodiments, one or more baseband chipsets may provide DCL control signals (and optionally one or more auxiliary signals) to a multiple PMCs or to different PMCs (e.g. not all baseband chipsets may be coupled to the same PMC or one or more baseband chipsets may be coupled to multiple PMCs).

In this illustrative embodiment, the baseband chipsets provide DCL control signals and optionally auxiliary signals to a single PMC. In other embodiments, one or more baseband chipsets may provide DCL control signals and optionally auxiliary signals to a multiple or different PMCs (e.g. not all baseband chipsets may be coupled to the same PMC or one or more baseband chipsets may be coupled to multiple PMCs).

The use of DCL signals significantly simplifies connection of the baseband chipset to PMC for scenarios requiring multiple PAs to operate simultaneously, such as is the case with multiple-input, multiple output (MIMO) systems, uplink carrier aggregation systems, array beamforming systems and other systems.

For example, the use of DCL signals significantly simplifies connection of the baseband chipset to PMC for scenarios requiring multiple PAs to operate simultaneously, such as is the case with multiple-input, multiple output (MIMO) systems, uplink carrier aggregation systems, array beamforming systems.

Further still, the DCL approach results in a transmit-side implementation which is simpler as compared to prior art transmit-side implementations. For example, in 5G designs across sub-6 GHz frequency bands (so-called "FR1 applications"), the DCL approach may be implemented using conventional driver circuits (e.g. conventional single-ended complementary metal oxide semiconductor (CMOS) driver circuits).

In 5G designs across RF frequency bands (including, but not limited to millimeter wave (MMW) frequency bands) (so-called "FR2 applications"), the DCL information may be transmitted along one or more transmission lines coupling a baseband chipset to an RF head unit (e.g. a MMW head) as will be described below in conjunction with FIGS. 2-4. As used herein, the term "transmission line" refers to any guided medium over which information may be conveyed at some frequency. A transmission line may be implemented in a coaxial configuration, a waveguide configuration, in a planar configuration including, but not limited to a stripline configuration, a microstrip configuration, a co-planar stripline configuration, etc. —and at any frequency up to and including optical frequencies (e.g. optical fiber).

Figure 11:
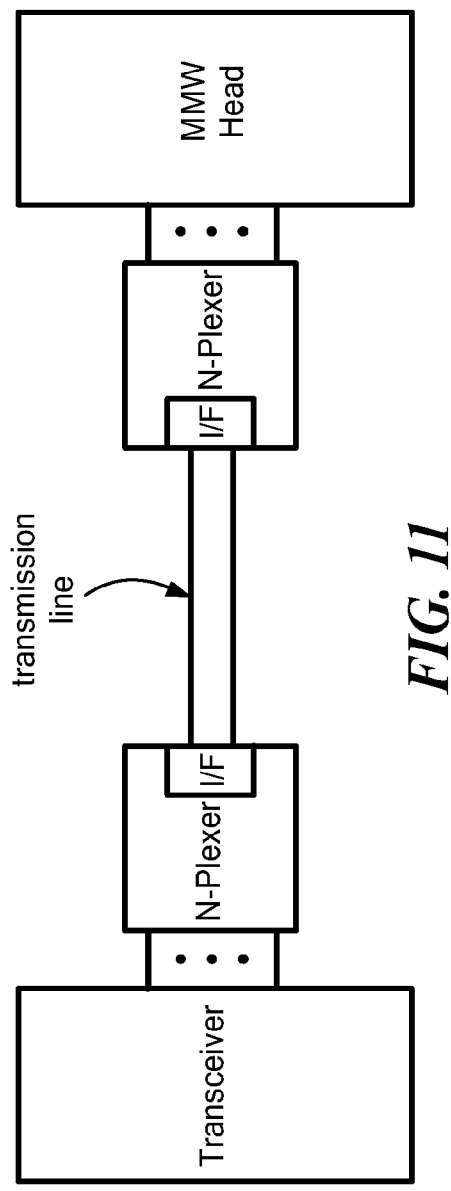
FIG. 11 is a block diagram of a system having a transmission line coupled between a baseband chipset and a radio frequency (RF) millimeter wave (MMW) head.

Referring now to FIG. 11, an RF transmission line is coupled between a baseband chipset and an RF head over which control and auxiliary signals may be provided. In embodiments, one or more RF transmission lines may be used. After reading the disclosure provided herein, one or ordinary skill in the art will appreciate how to select the number of transmission lines and the type of transmission line (e.g. coaxial, waveguide, strip transmission lines) to use for a particular application. Factors to consider in selecting a particular transmission line include, but are not limited to, frequency ranges and bandwidths of the signals being transmitted across the transmission line, size requirements (e.g. physical compatibility with other components in the system), environmental factors such as operating temperature ranges, and cost.

Figure 12:
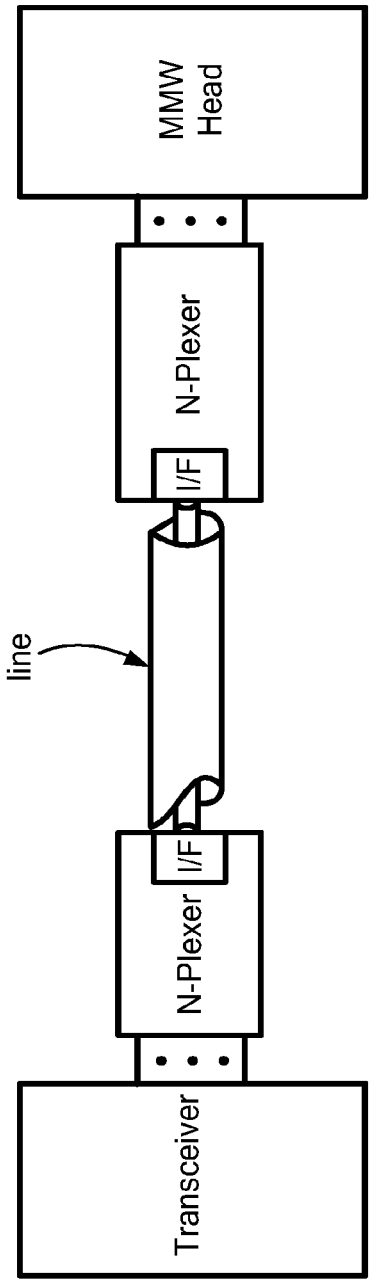
FIG. 12 is a diagram of an illustrative system having a coaxial transmission line coupled between a baseband chipset and a radio frequency (RF) head.

Referring now to FIG. 12, a coaxial transmission line is coupled between a baseband chipset and a RF head over which control and auxiliary signals may be provided. In embodiments, one or more coaxial transmission lines may be used. After reading the disclosure provided herein, one or ordinary skill in the art will appreciate how to select the number of transmission lines and the particular type of coaxial transmission line to use for a particular application. Factors to consider in selecting a particular coaxial transmission line include, but are not limited to, frequency ranges and bandwidths of the signals being transmitted, size requirements (e.g. physical compatibility with other components in the system), environmental factors such as operating temperature ranges, and cost.

In one example embodiment, the DCL information may be first encoded. In further embodiments, a plurality of DCL streams may be combined together Consider for example uncorrelated DCL streams "1" and "2", each of which may communicate one of three states: A, B, or C. A simple method of combining these uncorrelated streams would result in nine possible states for the two-stream combined configuration, wherein the combined stream "1,2" may take on values in the set [A,A; A,B; A,C; B,A; B,B; B,C; C,A; C,B; C,C].

DCL streams which are related by some correlation (e.g. similar average power, symbol or frame timing, etc.) may be combined more efficiently if the correlation makes some combinations of states impossible. For example, if a simultaneous combination of the states "A" and "C" on individual stream were not possible due to the signals' correlation, the number of states would be reduced to the seven values in the set [A,A; A,B; B,A; B,B; B,C; C,B; C,C].

Whether correlated or uncorrelated, combining DCL information streams results in an increased number of possible output states (and possibly resulting in a relatively large number of possible output states).

It should be further appreciated that time division multiplexing may be further utilized to encode the information and reduce the number of simultaneous states. For example, even numbered symbols of the combined DCL stream may indicate the state for independent DCL stream "1", and odd numbered symbols of the combined DCL stream may indicate the state for independent stream "2".

In embodiments, an encoder output may be modulated before up conversion to an intermediate frequency, multiplexed with pre-existing intermediate frequency modulation on a transmission line. In embodiments, the DCL information (which may include only DCL information, only encoded DCL information, or encoded DCL and PMC control information) may be up-converted to an intermediate frequency, which is different than the intermediate frequencies being used by MMW chipset to transmit other IQ and control signals.

Figure 13:
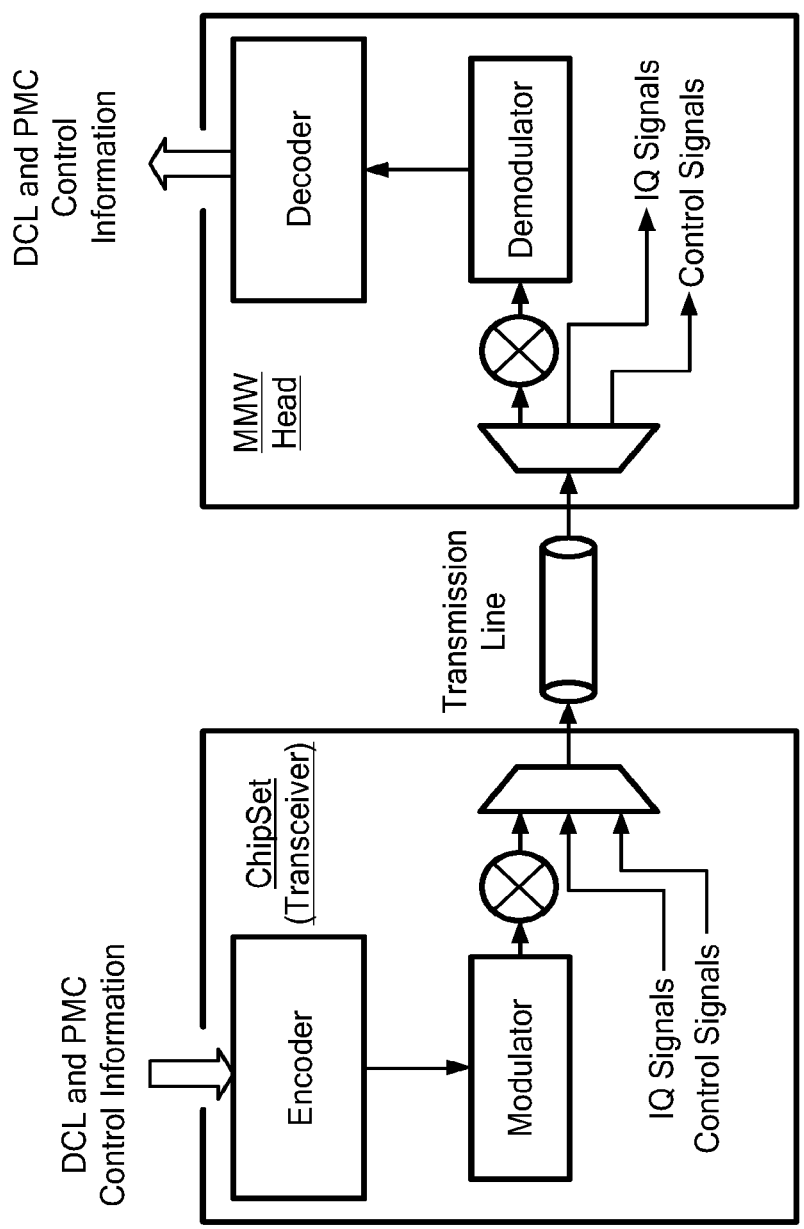
FIG. 13 is a block diagram of a system having a transmission line coupled between a baseband chipset and a radio frequency (RF) head.
Figure 13A:
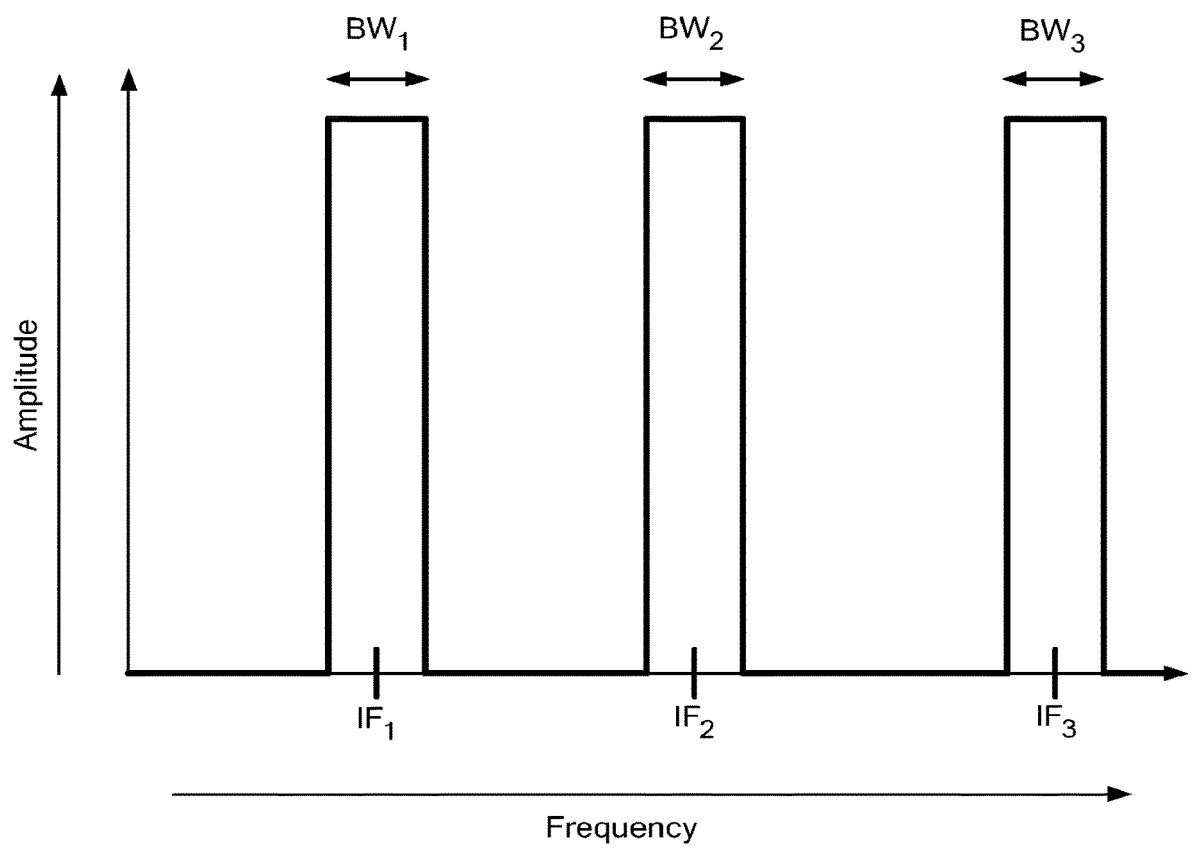
FIG. 13A is a plot of amplitude vs. frequency for a plurality of exemplary intermediate frequency (IF) signals being transmitted from a chipset to an RF head.
Figure 14:
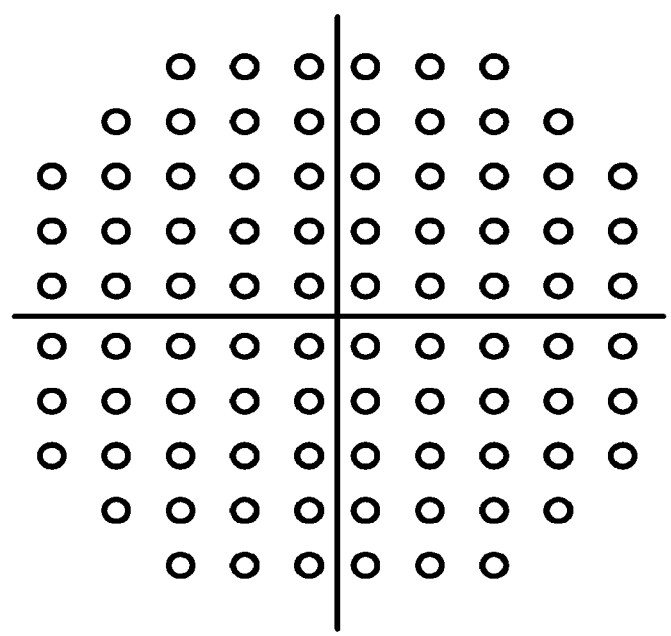
FIG. 14 is a constellation plot for an 88-quadrature amplitude modulation (QAM) system which may be the same as or similar to the system of FIG. 13.

Referring briefly to FIG. 13A, a plot illustrates one example of IQ, control and DCL/PMC control information transmitted at three different frequencies (referred to as intermediate frequencies in FIG. 13 and designated in FIG. 13A as $IF_1$, $IF_2$, $IF_3$ having respective bandwidths $BW_1$, $BW_2$, $BW_3$). Thus, FIG. 13A illustrates a plurality of exemplary intermediate frequency (IF) signals in which respective ones of IQ, control and DCL/PMC control information may transmitted from a chipset (such as the chipset in FIG. 13) to an RF head (such as the RF head in FIG. 13). The bandwidths $BW_1$, $BW_2$, $BW_3$ of each IF frequency signal may or may not be the same. In some embodiments two of the three bandwidths $BW_1$, $BW_2$, $BW_3$ may be the same. In some embodiments, all bandwidths $BW_1$, $BW_2$, $BW_3$ may be the same. In some embodiments, none of bandwidths $BW_1$, $BW_2$, $BW_3$ may be the same. Those of ordinary skill in the art will appreciate the necessary bandwidth required for the particular information being conveyed at each frequency $IF_1$, $IF_2$, $IF_3$. In practical embodiments, the bandwidths $BW_1$, $BW_2$, $BW_3$ are different. Although FIG. 13A illustrates information being transmitted at three different IF frequencies, in some embodiments it may be desirable or necessary to convey more or fewer than three types of information (i.e. more than IQ, control, and DCL/PMC control information) between a chipset and an RF head in which case, more or fewer than three IF frequencies may be used.

In some embodiments, control signal information (e.g. packet-based control signals) may be transmitted from the chipset to the RF head over the transmission line at frequency $IF_1$, IQ information may be transmitted from the chipset to the RF head over the transmission line at frequency $IF_3$ and DCL/PMC control information may be transmitted from the chipset to the RF head over the transmission line at frequency $IF_2$. That is, control signal information is transmitted between the chipset and RF head over the transmission line at a frequency which is less that the frequency at which IQ, and DCL/PMC control information is transmitted between the chipset and RF head over the transmission line. In embodiments, DCUPMC control information is transmitted between the chipset and RF head over the transmission line at a frequency which is less that the frequency at which IQ information is transmitted between the chipset and RF head over the transmission line. However each of the IQ, control and DCUPMC control information signals may be transmitted at any frequency within the frequency bandwidth of the transmission line coupled between the chipset and RF head with each of the IQ, control and DCUPMC control information signals being transmitted at separate frequencies.

In embodiments, it may be desirable to provide the transmission line between the chipset and the RF head as a single RF transmission line. In embodiments, it may be desirable to utilize a single RF transmission line to convey many types of signals in addition to DCL information. The signal may be de-multiplexed at the MMW head or other analog/RF front end, down converted from the intermediate frequency, and de-coded back into individual DCL streams for use at a PMC.

As noted above, in 5G designs across millimeter wave (MMW) frequency bands (so-called "FR2 applications"), the DCL information may be transmitted along one more RF transmission lines coupled between the baseband chipset and the MMW head. In embodiments, a single coaxial line transmission line may be used. In other embodiments, other types of transmission lines may be used.

One implementation provides for the DCL information to be first tri-state encoded, such that if the DCL value is unchanged a "0" is encoded, if the DCL value is decremented a "1" is encoded, and if the DCL value is incremented a "2" is encoded. Thus, the total number of unique values to be represented in tri-state coding is limited to three.

Referring now to FIG. 13, a baseband chipset is coupled to an RF head via an RF transmission line. In embodiment, the RF head may be provided as a millimeter wave (MMVV) RF head. The chipset includes an encoder configured to receive a plurality of DCL signal lines with four signal lines being shown in the example embodiment of FIG. 13. It should, of course, be appreciated that in some embodiments, the encoder may be configured to use fewer than four DCL signals lines (e.g. 2 DCL signal lines) or greater than four DCL signal lines (e.g. 8 DCL signal lines). It should, of course, be further appreciated that the PMC command information used to realize digital supply modulation may be internally conveyed to the encoder block within the transceiver by a digital means. In the following text the "DCL value" is meant to describe the PMC command information regardless of how that information is expressed. That is the encoder need not accept a "DCL" input format (e.g. two or more signal lines) to receive the DCL information. Rather, the information may be expressed as a digital signal (e.g. a binary digital signal) inside the transceiver and transmitted accordingly (e.g. over a digital bus or signal path).

In this example embodiment, four DCL streams (i.e. the DCL information on the four DCL signal paths) are tri-state encoded. As noted above, in a tri-state encoding technique if a DCL value is unchanged, a "0" is encoded; if a DCL value is decremented, a "1" is encoded; and if the DCL value is incremented, a "2" is encoded. Thus, with four (4) lines and the number of possible encoding states equal to three (3) there exists a total of $3^4$ (or 81) possible output states.

The encoder output is coupled to a modulator. The modulator receives encoded signals form the encoder and modulates the encoded DCL signals provided thereto. The modulated DCL signals are coupled from an output of the modulator to an input of an upconverter (e.g. a mixer) for conversion to an intermediate frequency (IF) signal. The output of the upconverter is coupled to a first input of a multiplexer.

The multiplexer also receives on a second input thereof a signal comprising IQ information (an IQ signal) and the multiplexor receives on a third input thereof a control signal (e.g. a packet-based control signal). Thus, in this example embodiment, the multiplexer corresponds to a triplexer. It should, of course, be appreciated that in other embodiments, it may be desirable or necessary to provide more than three signals to the multiplexer and thus the multiplexer may generally be referred to as an N-plexer. In embodiments, the multiplexer may receive additional inputs which may comprise IQ information (an IQ signal) and control signals (e.g. a packet-based control signal).

In this example embodiment the tri-state encoder output may be modulated using an 88 quadrature amplitude modulation (QAM) scheme before upconversion to the low-intermediate frequency (IF) signal and multiplexed with the pre-existing IF modulation on the coaxial transmission line. That is the modulator may be provided as an 88 QAM modulator. It should, of course, be appreciated that any modulated scheme (e.g. other than QAM modulation) may be used.

The modulated signal is transmitted via the RF transmission line and received at the RF head. The RF head comprises a demultiplexer having an input coupled to the RF transmission line and, in this example, first, second and third outputs. A first one of the demultiplexer outputs is coupled to an input of a downconverter (e.g. a mixer). IQ and control signals (e.g. packet-based control signals) are provided at second and third outputs of the multiplexer. In embodiments, the IQ and control signals may be coupled to a MMW transceiver.

An output of the downconverter is coupled to an input of a demodulator and an output of the demodulator is coupled to an input of a decoder. The demodulator demodulates the modulated signals provided thereto and provides a demodulated signal to the decoder. The decoder decodes the signals provided thereto and provides decoded signals at an output thereof. Thus, in this example embodiment, the modulated signal from the chipset is de-multiplexed at the RF head, down converted from the intermediate frequency, de-coded from tri-state form back into individual DCL streams for use at the PMC.

It should, however, be appreciated that other encodings are possible allowing different degrees of freedom from those described above.

For example, the DCL information may be directly encoded such that "1" corresponds to a first voltage output level or control state, "2" corresponds to a second output level or control state, and so on, up to the nth level or control state. When directly encoding uncorrelated DCL streams, "p" unique DCL information streams require $n^p$ unique states. Thus, 256 states (computed as $4^4$=256) would be required in a four-state system (i.e. n=4) having four unique outputs (i.e. p=4). In this example, a 256 QAM type modulation may be used.

The direct encoding technique allows the FSM to jump immediately (i.e. t be immediately changed) to a desired state without the need to first change to any adjacent states (i.e. a DCL state may move (or change) directly from one state to any other state instead of moving only to adjacent states). For example, moving from a first state (e.g. state "1") to a second, different state (e.g. state "3") with tri-state encoding requires a step to the intermediate state "2", while direct encoding allows the output to move directly from a first state (e.g. state "1") to a second, nonadjacent state (e.g. state "3"). Thus, the direct encoding scheme offers immediate access to any state at the expense of the more complex 256QAM modulation type, as compared to the tri-state encoding scheme offers access to only adjacent states but a simple 88QAM modulation type.

It is noted that freedom to place RF amplifiers away from the chipset and from other amplifiers is increasingly important for 5G NR applications where the number of unique RF amplifiers continually grows to address new frequency spectra.

After reading the disclosure provided herein, those of ordinary skill in the art will appreciate that the techniques described are not limited to 5G designs across MMW frequency bands. Rather, the techniques described may be used in any radio link and may find particular use in applications in which arrays could benefit from a RF interface such as a single RF interface, for example, a single-coaxial interface.

Other applications include, but are not limited to sub-6 massive MIMO, 5G, WiFi, other wireless and wireline signal transmission and/or radar applications.

All publications and references cited herein are expressly incorporated herein by reference in their entirety.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to disposed element "A" over element "B" includes situations in which one or more intermediate elements (e.g., element "C") is between element "A" and element "B" as long as the relevant characteristics and functionalities of elements "A" and "B" are not substantially changed by the intermediate elements. The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "at least one" are understood to include any integer number greater than or equal to one, i.e. one, two, three, four, etc. The term "a plurality" is understood to include any integer number greater than or equal to two, i.e. two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A system comprising:
a chipset;
a radio frequency (RF) head;
a signal path between the chipset and the RF head; and
means for conveying digitally controlled level (DCL) signal information from the chipset to the RF head via the signal path, wherein the DCL signal information is propagated along the signal path substantially simultaneously with information from one or more in phase/quadrature (IQ) signals, wherein the means for conveying the DCL signal information from the chipset to the RF head comprises:
an encoder configured to receive DCL signal information and configured to generate one or more encoded DCL signals at an output thereof;
a modulator having an input coupled to the output of the encoder, the modulator configured to receive the one or more encoded DCL signals from the encoder and modulate the one or more encoded DCL signals provided thereto;
an upconverter having an input coupled to the output of the encoder, the upconverter configured to convert the modulated, encoded DCL signals to an intermediate frequency (IF) signal; and
a multiplexer having a first input coupled to the output of the upconverter and configured to receive the one or more modulated, encoded DCL IF signals, and having a second input configured to receive already-present signals on the signal path, the multiplexer configured to multiplex the one or more modulated, encoded DCL IF signals and the already-present signals.

2. The system of claim 1 wherein the encoder is further configured to receive one or more encoded auxiliary signals for controlling a finite state machine.

3. The system of claim 1 wherein the modulator is configured to modulate an encoder output signal using quadrature amplitude modulation (QAM) before upconversion to an IF signal and multiplexing with the already-present signals.

4. The system of claim 1 wherein the modulator is configured to modulate the one or more encoded DCL signals using direct encoding before upconversion to the IF signal and multiplexing with the already-present signals.

5. A system comprising:
a chipset;
a radio frequency (RF) head;
a signal path between the chipset and the RF head; and
means for conveying digitally controlled level (DCL) signal information from the chipset to the RF head via the signal path by encoding and modulating the DCL signal information and then multiplexing the encoded, modulated DCL signal information with already-present signals on the signal path between the chipset and the RF head,
wherein the signal path coupled between the chipset and the RF head is a transmission line coupled between the chipset and the RF head, the transmission line configured to allow substantially simultaneous propagation of the multiplexed, modulated, encoded DCL signal information at a first intermediate frequency (IF) frequency, and information from one or more in phase/quadrature (IQ) signals at a second IF frequency.

6. The system of claim 5 wherein the RF head comprises a power management circuit (PMC) configured to accept the DCL signal information.

7. The system of claim 5 wherein the RF head is a millimeter wave head.

8. The system of claim 1,
wherein the RF head comprises:
a demultiplexer having an input coupled to an RF transmission line, the demultiplexer configured to receive the multiplexed one or more modulated, encoded DCL IF signals and the already-present signals and having a demultiplexer output, a downconverter having an input coupled to the output of the demultiplexer and configured to receive the one or more modulated, encoded DCL IF signals and having an output to output the modulated, encoded DCL signals;

a demodulator having an input coupled to the output of the downconverter, the demodulator configured to demodulate the modulated, encoded DCL signals provided thereto and provide one or more demodulated, encoded signals at an output thereof;

a decoder having an input coupled to the output of the demodulator, the decoder configured to decode the demodulated, encoded signals provided thereto and provide one or more decoded signals at an output thereof to provide one or more individual DCL signals.

9. The system of claim 8 wherein the RF head comprises a power management circuit (PMC) and the DCL signal information comprises information for controlling the PMC.

10. The system of claim 8 wherein the DCL signal information comprises packet-based control signals.

11. A chipset for a fifth-generation (5G) mobile handset, the chipset comprising:

means for conveying digitally controlled level (DCL) signal information from the chipset to a power management circuit (PMC) along a signal path, the DCL signal information being propagated along the signal path substantially simultaneously with information from one or more in phase/quadrature (IQ) signals, the means for conveying comprising:

means for encoding DCL signal information;

means for modulating DCL signal information; and means for multiplexing the encoded, modulated DCL signal information with already-present signals on a transmission line configured to carry signals between the chipset and the PMC, wherein the means for encoding is configured to receive DCL signal information and is configured to generate one or more encoded DCL signal information signals at an output thereof;

the means for modulating has an input coupled to the output of the means for encoding and is configured to receive one or more encoded DCL signal information signals from the means for encoding and modulate the encoded DCL signal information signals provided thereto; and the means for multiplexing has a first input coupled to the output of the means for modulating and configured to receive one or more modulated, encoded DCL signal information signals, and has a second input configured to receive already-present signals on the signal path, the means for multiplexing configured to multiplex the one or more modulated, encoded DCL signal information signals and the already-present signals at an output thereof.

12. The chipset of claim 11 further comprising:

an upconverter having an input coupled to an output of the means for encoding and an output coupled to a first input of the means for multiplexing, the upconverter configured to convert modulated encoded DCL signal information signals to an intermediate frequency (IF) signal different from the IF signal frequencies of the one or more IQ signals and the one or more control signals; and wherein the means for multiplexing multiplexer is configured to receive:

one or more modulated, encoded DCL signal information signals at a first IF frequency;

one or more IQ signals at a second IF frequency; and one or more control signals at a third IF frequency.

13. The chipset of claim 12 wherein:

the first IF frequency is different from the second IF frequency; and the second IF frequency is different from the third IF frequency.

14. The system of claim 5, wherein the means for conveying DCL signal information from the chipset to the RF head comprises an encoder configured to receive DCL signal information and configured to generate one or more encoded DCL signals at an output thereof.

15. The system of claim 14, wherein the means for conveying DCL signal information from the chipset to the RF head further comprises a modulator having an input coupled to the output of the encoder, the modulator configured to receive the one or more encoded DCL signals from the encoder and modulate the one or more encoded DCL signals provided thereto.

16. The system of claim 15, wherein the means for conveying DCL signal information from the chipset to the RF head further comprises a multiplexer having a first input coupled to the output of the upconverter and configured to receive the one or more modulated, encoded DCL IF signals, and having a second input configured to receive already-present signals on the signal path, the multiplexer configured to multiplex the one or more modulated, encoded DCL IF signals and the already-present signals.

17. The system of claim 14, wherein the encoder is further configured to receive one or more encoded auxiliary signals for controlling a finite state machine.

* * * * *